(12) United States Patent
Kazaryan et al.

(10) Patent No.: US 7,919,014 B2
(45) Date of Patent: Apr. 5, 2011

(54) ELECTRODE FOR USE WITH DOUBLE ELECTRIC LAYER ELECTROCHEMICAL CAPACITORS HAVING HIGH SPECIFIC PARAMETERS

(75) Inventors: Samvel Avakovich Kazaryan, Troitsk (RU); Gamir Galievich Kharisov, Troitsk (RU); Sergey Nikolaevich Razumov, Moscow (RU); Sergey Vitalievich Litvinenko, Zelenograd (RU); Vyacheslav I. Shumovsky, Moscow (RU)

(73) Assignee: Universal Supercapacitors LLC, Columbus, OH (US)

( * ) Notice: Subject to any disclaimer, the term of this patent is extended or adjusted under 35 U.S.C. 154(b) by 395 days.

(21) Appl. No.: 11/946,035

(22) Filed: Nov. 27, 2007

(65) Prior Publication Data

US 2008/0266754 A1 Oct. 30, 2008

Related U.S. Application Data

(60) Provisional application No. 60/867,284, filed on Nov. 27, 2006.

(51) Int. Cl.
*H01B 1/06* (2006.01)
*H01B 1/24* (2006.01)

(52) U.S. Cl. ..... 252/506; 252/500; 252/513; 252/518.1; 252/521.3; 252/521.4; 361/502; 361/508; 429/223; 429/235

(58) Field of Classification Search .......... 252/506, 252/500, 518.1, 521.3, 521.4; 361/263, 311, 361/502, 508, 529; 423/447.1; 429/12, 223, 429/235; 502/416; 208/216
See application file for complete search history.

(56) References Cited

U.S. PATENT DOCUMENTS

| | | | |
|---|---|---|---|
| 3,174,882 A | 3/1965 | Logan | |
| 3,601,665 A | 8/1971 | O'Nan et al. | |
| 3,634,736 A | 1/1972 | Boos et al. | |
| 3,652,902 A | 3/1972 | Hart et al. | |
| 3,825,802 A * | 7/1974 | Kumagai et al. | 361/529 |
| 4,438,481 A | 3/1984 | Phillips et al. | |
| 4,518,488 A * | 5/1985 | Wennerberg | 208/216 R |

(Continued)

FOREIGN PATENT DOCUMENTS

CA 2137323 6/1995
(Continued)

OTHER PUBLICATIONS

Evans, David A. & Miller, John R., Hybrid Electrolytic/Electrochemical Capacitor for Electric Vehicles, Prodceedings—Electrochemical Society, 1997, pp. 253-257, vol. 96-25.
Varakin, I.N., Klementov, A.D., Litvinenko, S.V., Starodubtsev, N.F., & Stepanov, A.B., Electrochemical Ultracapacitors and Modules of "ESMA" Company, Official Prodeeings 11th Int. Power Quality, Nov. 1998, pp. 90-98.

*Primary Examiner* — Mark Kopec
*Assistant Examiner* — Khanh Tuan Nguyen
(74) *Attorney, Agent, or Firm* — Standley Law Group LLP

(57) ABSTRACT

The present invention relates to the production of electrochemical capacitors with a DEL. The proposed electrodes with DEL are based on non-metal conducting materials, including porous carbon materials, and are capable of providing for high specific energy, capacity and power parameters of electrochemical capacitors. P-type conductivity and high concentration of holes in electrode materials may be provided by thermal, ionic or electrochemical doping by acceptor impurities; irradiating by high-energy fast particles or quantums; or chemical, electrochemical and/or thermal treatment. The present invention allows for an increase in specific energy, capacity and power parameters, as well as a reduction in the cost of various electrochemical capacitors with DEL. The proposed electrodes with DEL can be used as positive and/or negative electrodes of symmetric and asymmetric electrochemical capacitors with aqueous and non-aqueous electrolytes.

23 Claims, 9 Drawing Sheets

U.S. PATENT DOCUMENTS

| | | |
|---|---|---|
| 4,562,511 A | 12/1985 | Nishino et al. |
| 4,605,989 A | 8/1986 | Marse et al. |
| 4,697,224 A | 9/1987 | Watanabe |
| 5,045,170 A | 9/1991 | Bullock et al. |
| 5,065,286 A | 11/1991 | Kurabayashi et al. |
| 5,072,335 A | 12/1991 | Kurabayashi et al. |
| 5,072,336 A | 12/1991 | Kurabayashi et al. |
| 5,072,337 A | 12/1991 | Kurabayashi et al. |
| 5,080,963 A | 1/1992 | Tatarchuk et al. |
| 5,099,398 A | 3/1992 | Kurabayashi et al. |
| 5,102,745 A | 4/1992 | Tatarchuk et al. |
| 5,121,301 A | 6/1992 | Kurabayashi et al. |
| 5,142,451 A | 8/1992 | Kurabayashi et al. |
| 5,187,033 A | 2/1993 | Koshiba |
| 5,262,254 A | 11/1993 | Koksbang et al. |
| 5,298,470 A * | 3/1994 | Chia et al. .................... 501/89 |
| 5,304,330 A | 4/1994 | Tatarchuk et al. |
| 5,369,547 A | 11/1994 | Evans |
| 5,392,191 A | 2/1995 | Thomas et al. |
| 5,429,893 A | 7/1995 | Thomas |
| 5,441,830 A | 8/1995 | Moulton et al. |
| 5,464,453 A | 11/1995 | Tong et al. |
| 5,464,706 A | 11/1995 | Dasgupta et al. |
| 5,464,707 A | 11/1995 | Moulton et al. |
| 5,478,676 A | 12/1995 | Turi et al. |
| 5,518,839 A | 5/1996 | Olsen |
| 5,527,640 A | 6/1996 | Rudge et al. |
| 5,547,782 A | 8/1996 | Dasgupta et al. |
| 5,557,497 A | 9/1996 | Ivanov et al. |
| 5,568,353 A | 10/1996 | Bai et al. |
| 5,578,396 A | 11/1996 | Fauteux et al. |
| 5,578,399 A | 11/1996 | Olsen |
| 5,580,686 A | 12/1996 | Shi et al. |
| 5,600,535 A | 2/1997 | Jow et al. |
| 5,604,660 A | 2/1997 | Bai et al. |
| 5,621,607 A | 4/1997 | Farahmandi et al. |
| 5,714,053 A | 2/1998 | Howard |
| 5,729,427 A | 3/1998 | Li et al. |
| 5,777,428 A | 7/1998 | Farahmandi et al. |
| 5,824,436 A | 10/1998 | Lian et al. |
| 5,955,215 A | 9/1999 | Kurzweil et al. |
| 5,963,417 A | 10/1999 | Anderson et al. |
| 5,986,876 A | 11/1999 | Stepanov et al. |
| 6,031,711 A | 2/2000 | Tennent et al. |
| 6,031,712 A | 2/2000 | Kurihara et al. |
| 6,059,847 A | 5/2000 | Farahmandi et al. |
| 6,063,143 A | 5/2000 | Stepanov et al. |
| 6,064,561 A | 5/2000 | Harada et al. |
| 6,088,217 A | 7/2000 | Patel et al. |
| 6,094,338 A | 7/2000 | Hirahara et al. |
| 6,115,235 A | 9/2000 | Naito |
| 6,152,970 A | 11/2000 | Wei et al. |
| 6,181,545 B1 | 1/2001 | Amatucci et al. |
| 6,181,546 B1 | 1/2001 | Stepanov et al. |
| 6,187,061 B1 | 2/2001 | Amatucci et al. |
| 6,195,252 B1 | 2/2001 | Belyakov et al. |
| 6,201,685 B1 | 3/2001 | Jerabek et al. |
| 6,205,016 B1 | 3/2001 | Niu |
| 6,222,723 B1 | 4/2001 | Razoumov et al. |
| 6,335,857 B1 | 1/2002 | Takimoto et al. |
| 6,335,858 B1 * | 1/2002 | Vasechkin et al. ............ 361/502 |
| 6,339,529 B1 | 1/2002 | Kasahara et al. |
| 6,341,057 B1 | 1/2002 | Nissen et al. |
| 6,343,003 B1 | 1/2002 | Sakata et al. |
| 6,349,027 B1 | 2/2002 | Suhara et al. |
| 6,350,520 B1 | 2/2002 | Nesbitt et al. |
| 6,353,528 B1 | 3/2002 | Hori et al. |
| 6,356,432 B1 | 3/2002 | Danel et al. |
| 6,356,433 B1 | 3/2002 | Shi et al. |
| 6,379,402 B1 | 4/2002 | Suhara et al. |
| 6,383,427 B2 | 5/2002 | Ishikawa et al. |
| 6,383,640 B1 | 5/2002 | Shi et al. |
| 6,402,792 B1 | 6/2002 | Hiratsuka et al. |
| 6,414,836 B1 | 7/2002 | Tennent et al. |
| 6,426,862 B1 | 7/2002 | Vasechkin et al. |
| 6,430,031 B1 | 8/2002 | Dispennette et al. |
| 6,449,139 B1 | 9/2002 | Farahmandi et al. |
| 6,454,815 B1 | 9/2002 | Finello et al. |
| 6,466,429 B1 | 10/2002 | Volfkovich et al. |
| 6,491,789 B2 | 12/2002 | Niu |
| 6,493,210 B2 | 12/2002 | Nonaka et al. |
| 6,503,432 B1 | 1/2003 | Barton et al. |
| 6,510,043 B1 | 1/2003 | Shiue et al. |
| 6,512,667 B2 | 1/2003 | Shiue et al. |
| 6,515,845 B1 | 2/2003 | Oh et al. |
| 6,522,522 B2 | 2/2003 | Yu et al. |
| 6,563,694 B2 | 5/2003 | Kim et al. |
| 6,574,092 B2 * | 6/2003 | Sato et al. ..................... 361/502 |
| 6,576,365 B1 | 6/2003 | Meitav et al. |
| 6,584,827 B2 * | 7/2003 | Kiesele et al. ............... 73/31.05 |
| 6,602,742 B2 | 8/2003 | Maletin et al. |
| 6,614,646 B2 | 9/2003 | Bogaki et al. |
| 6,628,504 B2 | 9/2003 | Volfkovich et al. |
| 6,631,074 B2 | 10/2003 | Bendale et al. |
| 6,702,963 B2 | 3/2004 | Kibi et al. |
| 6,706,079 B1 | 3/2004 | Shmatko et al. |
| 6,762,926 B1 | 7/2004 | Shiue et al. |
| 6,773,468 B2 | 8/2004 | Lang |
| 6,830,595 B2 | 12/2004 | Reynolds |
| 6,855,273 B2 | 2/2005 | Ravet et al. |
| 6,876,539 B2 | 4/2005 | Michel et al. |
| 6,924,063 B2 | 8/2005 | Che et al. |
| 6,937,460 B2 | 8/2005 | Lang |
| 6,940,706 B2 | 9/2005 | Sakata et al. |
| 6,962,666 B2 | 11/2005 | Ravet et al. |
| 6,967,183 B2 | 11/2005 | Hampden-Smith et al. |
| 7,006,346 B2 | 2/2006 | Volfkovich et al. |
| 7,312,976 B2 | 12/2007 | Kazaryan et al. |
| 7,485,279 B2 * | 2/2009 | Pfefferle et al. ........... 423/447.1 |
| 2002/0048144 A1 | 4/2002 | Sugo et al. |
| 2002/0114126 A1 | 8/2002 | Hirahara et al. |
| 2002/0122980 A1 | 9/2002 | Fleischer et al. |
| 2002/0122985 A1 | 9/2002 | Sato et al. |
| 2002/0136946 A1 | 9/2002 | Amatucci et al. |
| 2003/0031926 A1 | 2/2003 | Farmer et al. |
| 2003/0036001 A1 | 2/2003 | James et al. |
| 2003/0070916 A1 | 4/2003 | Nanno et al. |
| 2003/0118884 A1 | 6/2003 | Hampden-Smith et al. |
| 2003/0180209 A1 | 9/2003 | Gordeev et al. |
| 2004/0120100 A1 | 6/2004 | Reynolds |
| 2004/0131944 A1 | 7/2004 | Visco et al. |
| 2004/0140458 A1 | 7/2004 | Ravet et al. |
| 2004/0141282 A1 | 7/2004 | Hudis |
| 2004/0191617 A1 | 9/2004 | Visco et al. |
| 2004/0197641 A1 | 10/2004 | Visco et al. |
| 2004/0199015 A1 | 10/2004 | Yuyama et al. |
| 2005/0007727 A1 | 1/2005 | Lang |
| 2005/0019656 A1 | 1/2005 | Yoon et al. |
| 2005/0089754 A1 | 4/2005 | Lang |
| 2005/0141170 A1 | 6/2005 | Honda et al. |
| 2005/0271798 A1 | 12/2005 | Zhong et al. |
| 2006/0021649 A1 * | 2/2006 | Kuroda et al. ................ 136/263 |
| 2006/0202234 A1 * | 9/2006 | Hara ............................ 257/213 |
| 2006/0240979 A1 * | 10/2006 | Hirahara et al. ............. 502/416 |
| 2008/0002329 A1 * | 1/2008 | Pohm et al. .................. 361/311 |
| 2008/0266754 A1 * | 10/2008 | Kazaryan et al. ............ 361/508 |
| 2009/0258255 A1 * | 10/2009 | Terashima et al. ............. 429/12 |

FOREIGN PATENT DOCUMENTS

| | | |
|---|---|---|
| EP | 0680061 | 11/1995 |
| EP | 0763836 | 3/1997 |
| EP | 1043744 | 10/2000 |
| EP | 1156500 | 11/2001 |
| EP | 1013506 | 6/2002 |
| JP | 2006-270051 | * 10/2006 |
| WO | 96/12313 | 4/1996 |
| WO | 9924996 | 5/1999 |
| WO | 0033336 | 6/2000 |
| WO | 0219357 | 3/2002 |
| WO | 03/098648 | 11/2003 |

* cited by examiner

US 7,919,014 B2

ELECTRODE FOR USE WITH DOUBLE ELECTRIC LAYER ELECTROCHEMICAL CAPACITORS HAVING HIGH SPECIFIC PARAMETERS

BACKGROUND OF THE INVENTIVE FIELD

The present invention relates to electrochemical capacitors with a double electric layer (DEL), and can be used in the production of electrochemical capacitors with a DEL. A proposed electrode with a DEL based on non-metal conducting materials, including porous carbon materials, is capable of providing for electrochemical capacitors with high specific energy, capacity, and power parameters, as well as low cost. Electrodes according to the present invention can be used as positive and/or negative electrodes of symmetric and asymmetric electrochemical capacitors with aqueous or non-aqueous electrolytes.

Recently, carbon materials have increasingly attracted the attention of both theoreticians and experimentalists due to the great number of unique properties which properties make it possible to widen the scope of their practical application. Manufacture of electrodes for electrochemical capacitors is one of the most promising directions for extensive use of such carbon materials. The research of physical, electrical, electrochemical and other properties of activated carbon materials for their effective use in electrochemical capacitors with aqueous and organic electrolytes has resulted in considerable development of the technology of synthesis and improvement of different parameters of carbon materials. However, many theoretical calculations show that the currently achieved level of energy, capacity and operational parameters of the best examples of modern electrochemical capacitors based on carbon materials are limited by performance capabilities of the carbon materials. It is possible, however, to control in a wide range the fundamental properties of carbon materials (including those ones which are important for electrochemical capacitors) by means of their doping by different elements, thereby allowing for a considerable step forward on the path to the improvement of electrochemical capacitors' parameters.

The electrical, electrochemical and physical properties of carbon materials which determine the main parameters of the electrochemical capacitors in which they are used are closely related to the concentration and type of impurity atoms present, structural defects of the crystal lattice, and the dimensions and form of the carbon particles. The activated carbon materials that are used in the manufacture of electrodes of modern electrochemical capacitors usually contain a great number of structural defects and are not pure substances. The quantity and type of impurity atoms may vary from several ppm to several percent. Many impurity atoms are contained in the initial materials, and partially penetrate the carbon materials during their synthesis. Certain impurities during the synthesis of carbon materials are deliberately used as catalysts to influence the process of graphitization and modification of parameters and the condition of the surface of carbon particles. This results in an increase of the concentration of uncontrolled impurities in carbon materials. The presence of different types of uncontrolled impurity atoms in the crystal lattice may considerably change important properties of carbon materials, which can have a negative effect on the parameters of subsequently constructed capacitors. This is one of the major causes of low specific energy, capacity and power parameters of electrochemical capacitors with carbon electrodes.

SUMMARY OF GENERAL INVENTIVE CONCEPT

On the other hand, the control of impurity concentrations that have a positive effect on the parameters of carbon materials and of capacitors in general, makes it possible to control the properties of carbon materials and, consequently, of the capacitors in which such materials are used. According to the present invention, exercising technological control over the parameters of carbon materials makes it possible to improve and optimize specific energy and power parameters of modern engineered capacitors, and to develop new capacitors with more advanced parameters.

As proposed in the present invention, the essence of electrode materials for electrochemical capacitors with a DEL, and having high specific parameters, is explained by the following description of the physical processes of formation of DEL capacitance and its dependence on the type of conductivity, the concentrations of free charge carriers and doping impurities, and by the description of the technology of doping carbon materials, by the specific examples of doping and testing of energy, and by the capacity and electrical parameters of carbon materials.

In order to provide for high specific energy and power parameters of electrochemical capacitors with a DEL, porous carbon materials which have high specific developed surface ($1,200$-$2,000\ m^2/g$) are typically used. Except for the capacity parameters, the electrical, electrochemical and physical properties of porous carbon materials also depend on the dimensions and forms of pores present therein. Consequently, the spatial structure of porous carbon materials also influences their main parameters and may become one of the major levels of control of carbon material parameters. For example, the electrical properties of the graphite planes of finite dimensions are considerably different from the properties of the volume graphite and are determined by the concentration of free charge carriers and concentration and type of structural defects. If the graphite particle has a stepped surface, localized states appear on the Fermi level, whose density is related to the dimensions of the particle. Thus, by changing the dimensions and structure of carbon particles it is possible to control the concentration of localized states.

As a rule, graphite is a semiconductor with a quite narrow band gap and is sometimes considered to be a semi-metal. Its Fermi level is in the valence band, since the effective mass of its electrons is greater than the effective mass of its holes. However, many properties of graphite and other narrow-band carbon materials are quite well characterized by the band theory of semiconductors because the hole gas of the bulk of these materials is a degenerate gas.

A great number of lattice defects in the carbon materials results in the fact that the bulk of these materials have p-type conductivity. When different impurity atoms are present in the carbon materials, some part of the carbon materials has electronic conductivity. The concentration of holes in the porous carbon materials of p-type conductivity is quite well characterized by the theory of degenerate semiconductors in which the concentration of holes depends on the position of Fermi level. Position of Fermi level also determines the density of the surface state, the concentration of electrons and the conductivity of carbon materials. The concentration of holes and electrons of the p-type carbon material in which the electronic gas is not degenerate, and the hole gas is degenerate, are expressed by the formula respectively:

$$p = \frac{(2m_h \xi_F)^{3/2}}{3\pi^2 \hbar^{-3}} \quad (1)$$

$$n = 2\left(\frac{m_e kT}{2\pi \hbar^{-2}}\right)^{3/2} \exp\left(\frac{E_F - E_C}{kT}\right) \quad (2)$$

where $\xi_F = E_V - E_F$ ($E_V$ being the energy of valence band top, $E_F$ being Fermi energy level, $E_C$ being energy of conduction band bottom, and $m_h$ and $m_e$ being effective mass of holes and electrons, respectively).

The conductivity of the wall's pores may be represented by:

$$\sigma = e(p\mu_p + n\mu_n) \quad (3)$$

where: $\mu_n$ and $\mu_p$ are the mobilities of electrons and holes, respectively, and depend on the concentration and mobility of holes and electrons. It follows from formulas (1), (2) and (3) that the values p, n and $\sigma$ change along with the change of Fermi level position.

The DEL structure of an "electrolyte-solid body" interface and DEL capacitance depend on both the properties of the electrolyte and the properties of the solid body. Usually, the electric charge of a DEL from the side of different metal solid electrodes is localized in their near-surface layer due to a high concentration of free electrons. The thickness of the localized layer typically has a value of not more than about 0.5-2 Å subject to the type of the metal and, in a wide range, does not, in fact depend on the value of the surface potential of the metal. The non-metal conducting materials have quite a different pattern. Since the concentration of free charge carriers in the non-metal conducting materials (which include activated carbon materials) is considerably lower than in the metals, the electric charge of a DEL from the side of the non-metal conducting materials penetrates deep into the near-surface layer, whose thickness is much greater than the thickness of the similar layer of metals.

Apart from the low concentration of free charge carriers, the non-metal conducting materials (semiconductors) also have p-type or n-type conductivity. This often brings about a change of the type of conductivity in the near-layer surface of the electrodes made of non-metal conducting materials when their surface potential changes greatly in the process of charge and discharge of the capacitors. Therefore, when activated carbon materials are used as electrodes of electrochemical capacitors with a DEL, DEL capacitance and the conductivity of the electrodes depends considerably on the concentration of free charge carriers and the potential of the carbon electrodes.

In order to review the dependences of DEL capacitance of an "electrolyte-solid body" interface and the conductivity of non-metal conducting electrodes on their potential and electrode material parameters, consider the carbon material porous electrode with p-type conductivity. Assume that the surface (at x=0) of the pore's wall is in contact with the electrolyte and the wall's volume is $0 \leq x \leq d_{wall}$, where $d_{wall}$ is the thickness of the pore's wall. Also assume that, at high values of the near surface (at x=0) potential ($\phi_s$) of the wall, the condition $\phi(x=d_{wall}) = \phi_{pzc}$ is met (where $\phi_{pzc}$ is the potential of the zero charge of the wall in relation to the potential of the compact Helmholtz layer). The value $\phi(x)$ is the electrode potential $\psi(x)$ of the interface. The surface states of the pore's wall creates in the band gap a set of energy levels with $E_S$ energy (FIG. 1). If the surface potential is equal to zero (i.e., $\phi_s = 0$), the energy bands of the wall are flat, and the value of $\psi$ potential of the interface corresponds to the potential of the zero charge.

When the surface potential $\phi_s$ shifts to the positive area ($\phi_s > 0$) and the electrolyte's positive ions are accumulated in the surface of the wall from the side of the electrolyte, the wall's energy bands become bent downwards as it is shown in FIG. 1a. In the near-surface layer of the pore's wall there occurs a space charge. The thickness (W) of the space charge region (SCR) depends on the $\phi_s$ value and parameters of the pore's wall. In this case, the potential is $\psi < 0$, and usually such processes occur in DEL negative electrodes of electrochemical capacitors.

When a shift of surface potential $\phi_s$ takes place to the area of negative values (the electrolyte's negative ions are accumulated in the wall's surface from the side of the electrolyte), the energy bands of the wall become bent upwards (see FIG. 1b.) This process takes place in the positive polarizable electrodes of electrochemical capacitors with a DEL (i.e., $\psi > 0$). It should also be noted that in some heterogeneous electrochemical capacitors in which only one electrode is the one with a DEL, surface potential $\phi_s$ changes from negative to positive values during their charge and discharge.

According to the above, it is obvious that DEL capacitance ($C_{DEL}$) of the "electrolyte-solid body" interface may be represented as two serially connected components: the first one—from the side of the electrolyte ($C_{EL}$); the second one—from the side of the solid body ($C_S$). Besides, capacitance $C_S$ also consists of two major components—capacitance of the space charge region ($C_{SC}$) and capacitance determined by the surface states ($C_{SS}$). The capacitances $C_{SC}$ and $C_{SS}$ are connected in parallel and the capacitances $C_{EL}$ and $C_S$ are connected in series as it is shown in FIG. 1. DEL capacitance may be expressed by the following formula:

$$\frac{1}{C_{DEL}} = \frac{1}{C_{EL}} + \frac{1}{C_{SS} + C_{SC}} \quad (4)$$

The formula (4) shows that the value of DEL capacitance of the "electrolyte-solid body" interface depends not only on the capacitance from the side of the electrolyte, as it is usually considered, but also on the capacitance of the near-surface layer of the pore's walls. If various effects on the electrolyte's parameters bring about a slight change of $C_{EL}$ only, the effect on different parameters of the solid body, according to the present invention, will make it possible to change the value of $C_{SC}$ and $C_{SS}$ in a wide range and, consequently, of DEL capacitance in general. Increasing $C_{SC}$ and $C_{SS}$ capacitances by means of control of the electrode material parameters is the most efficient method of increasing the specific energy parameters of the modern electrochemical capacitors.

When surface potential $\phi_s$ changes, the energy levels of the surface states, of acceptors and of donors, as well as of the positions of the edges of valence band ($E_V$) and conductivity band ($E_C$), shift at the surface in relation to Fermi level $E_F$. When an $E_S$ level is passing via $E_F$, the charge state of the level changes. Since both acceptor and donor surface levels are usually present in the activated carbon materials, the acceptor levels are filled with electrons when surface potential $\phi_s$ shifts to the positive range of the potentials, and the donor levels are emptied of electrons. When surface potential $\phi_s$ shifts to the negative range of the potentials, there occurs a reverse process—the acceptor levels are emptied of electrons, and the donor levels are filled with electrons. That is, when there is a shift in the potential of the pore wall surface I, the surface states are filled with free charge carriers and the electric charge of the charged surface states are compensated by DEL charge from the side of the electrolyte (i.e., the surface states are capable of storing an electric charge), and a change of the surface potential and increase of their concentrations will bring about an increase of DEL capacitance of the interface. Consequently, the use of capacitance of the surface states is a key to any substantial increase in the capacitance of electrochemical capacitors.

It follows from the above that the value of $C_{SS}$ capacitance depends on the concentration and type of the surface states and value of the potential of the electrode with a DEL. For example, for a negative carbon electrode of the capacitor, $C_{SS}$ capacitance will have the maximum value if the surface states are acceptor states only, and the electrode's potential is $\psi \geq \psi_{PZC}$. In order to obtain high values of $C_{SS}$ of the positive electrode with a DEL, on the contrary, the surface states should be donor states, and the potential of the electrode should be $\psi \geq \psi_{PZC}$. It should be noted that the use of similar materials of the positive and negative electrodes with DEL in symmetric capacitors will result in different values of electrode capacitance, which will be accompanied by a decrease of the specific capacity, energy and power parameters of the capacitors (as it will be shown below).

The capacitance $C_{SC}$ grows along with a decrease of W. Further, the value of W decreases along with the growth of the concentration of the wall's majority charge carriers and increases along with the increase of the absolute value of the surface potential $\phi_s$ (i.e., the value of $C_{SC}$ capacitance depends on the surface potential of the wall and concentration of the majority charge carriers in SCR). Consequently, along with the change of surface potential $\phi_s$, the values of $C_{SS}$ and $C_{SC}$ capacitances change and, as it follows from the formula (4), DEL capacitance is a function of surface potential $\phi_s$. The value of $C_{SS}$ depends on the density, type of surface states, energy position in the band gap of the surface states levels, and on the position of Fermi level. The capacitance of $C_{SC}$ depends on the concentrations of impurity atoms, lattice defects in the pore's walls and the position of Fermi level in the band gap of SCR. Consequently, by increasing the density of the surface state and controlling the position of Fermi level, the maximum values of $C_{SS}$ and $C_{SC}$ may be achieved. That is, controlling Fermi level position, the concentration of intrinsic defects, and impurity centers and surface state density will allow for maximum capacity and energy parameters of associated capacitors.

The surface states in the porous carbon materials, which play a role of electron capture centers, are related to the intrinsic lattice defects. The concentrations of the surface states grow along with a growth of the developed surface and a decrease in the dimensions of crystallites of the carbon materials. Also, some part of $E_S$ energy levels of the surface states is in the band gap, as it is shown in FIG. 1. The rate of the filling of $E_S$ by electrons depends on the position of Fermi level ($E_F$) in the band gap of SCR and on the value of surface potential $\phi_s$.

The concentration of p-holes in the defect-free monocrystal graphite is $5 \cdot 10^{18}$ cm (at T=4 K), and in the activated carbon materials $\rho$ changes in the range of $1 \cdot 10^{19}$-$5 \cdot 10^{19}$ cm$^{-3}$—subject to the rate of purity, technology of synthesis and activation of carbon materials. The high concentration of holes in the porous carbon materials is mostly determined by the presence of intrinsic lattice defects, various impurity atoms and their complexes with intrinsic defects which create donor and acceptor levels in the band gap. The total concentration of acceptors is higher than the total concentration of donors in standard activated carbon materials, and, as a result of the mutual compensation of donors and acceptors, the material has p-type conductivity. Generally, in order to increase the capacitance of the carbon materials which are used for the manufacture of electrodes for electrochemical capacitors with DEL, it is sufficient to increase their specific surface (S). But any increase of S will result in a decrease of the thickness of the pore walls ($d_{wall}$). When the wall thickness $d_{wall} \leq L_D$ (where L represents Debay screening length), then:

$$L_D = \sqrt{\frac{\varepsilon \varepsilon_0 kT}{e^2 p}} \quad (5)$$

where: $\epsilon$ is the permittivity of the wall (for the graphite $\epsilon$=5), and $\epsilon_0$ is the permittivity of the vacuum ($\epsilon_0$=8.85·10$^{-14}$ F/cm), the screening capability of SCR decreases, which brings about a decrease of $C_{SC}$ capacitance. Assuming that in conventional carbon materials p=10$^{19}$ cm$^{-3}$, formula (5) provides that $L_D$=8.32 Å (at T=300 K). Since in the porous electrode the electrolyte is in contact with the both sides of the pore walls, it can be established that the effectiveness of the wall's screening decreases dramatically at $d_{wall} \leq 16.64$ Å. At a 16.6 Å average thickness of the walls of the pores of the carbon material, the specific area of the developed surface does not exceed 700 m$^2$/g, which results in low values of the specific energy parameters of the associated capacitors. When the concentration of the holes increases to the value of p=10$^{20}$ cm$^{-3}$, Debay screening length decreases to $L_D$=2.63 Å. In this case, the effectiveness of the screening of the pore walls is retained at the values of $d_{wall} \leq 5.26$ Å, which makes it possible to increase the value of S parameter of the carbon materials to 1,800 m2/g. It is clear that a high value of S will make it possible to considerably increase the specific energy and capacity parameters of capacitors.

Therefore, in order to increase the specific capacity of a DEL, and, accordingly, the specific capacity of the electrode with DEL, it is necessary to increase the S parameter and the values of CSS and CSC capacitances of the electrodes. Any increase of the specific capacity of the electrode with DEL is effected in practice by increasing the specific surface S of the electrode materials. It should be noted that an increase of the S parameter also brings about the growth of the surface state density and, consequently, CSS capacitance. Therefore, on the one hand, the increase of the S parameter results in a growth of the specific capacity and a decrease in the thickness of the pore walls, while on the other hand, at the value of $d_{wall} \leq 2L_D$ the capacitance of $C_{DEL}$ starts decreasing and any further decrease of $d_{wall}$ is accompanied by a decrease in the specific capacity of the electrode. This aspect imposes limits on the specific capacity parameters of conventional electrodes with DEL and, accordingly, specific energy and capacity parameters of capacitors in general.

In fact all the porous carbon materials have pores with different dimensions and different thicknesses of their walls and the pores with thin walls make a small contribution to the total capacity. Therefore, despite high values of S (1,400-2,000 m$^2$/g), many carbon materials have low specific capacitance. This is determined by the fact that these materials, with thin walls of the main pores, have low concentration of free carriers and low conductivity. As it is stated above, the specific capacitance of the porous non-metal conducting materials, except for specific area of the developed surface, depends significantly also on the type and value of their conductivity. The presence of p-type conductivity with high concentration of holes of the carbon materials having high area of the developed surface results in a decrease of Debay screening length and an increase of their specific capacitance. In order to provide for p-type conductivity of the porous carbon materials, it is necessary to increase the concentration of acceptors in the walls of their pores and/or the concentration of intrinsic defects of the crystal lattice. The following explanations will clarify the essence of these options.

At a low concentration of holes in the pore walls, the electric field screening is determined not by the holes in the valence band, but by the charged impurities available in the walls. If the concentration of non-ionized acceptors (donors) in the wall is $N_a \gg p$, the electric field screening length is expressed by the formula:

$$L_E = \sqrt{\frac{2\varepsilon\varepsilon_0 kT}{e^2 N_a}} \quad (6)$$

In the case of incomplete ionization of impurities, when the wall's potential changes, the charge in SCR screening the electric field is created not only by redistribution of the holes, but by the spatial change of the charge impurities. Therefore, if there are acceptor or donor impurities in the walls whose concentration may reach about $10^{20}$ cm$^{-3}$ or more, the screening length will be small at low values of the concentration of free charge carriers. Consequently, a decrease of the wall thickness to quite low values, which are determined by the concentrations of donor and acceptor impurities, will make it possible to increase the specific surface area and, correspondingly, the specific capacity of, the carbon materials. According to formula (6) above, the screening length is 2.63 Å and the specific surface area may be increased to 1800 m/g at a $2 \cdot 10^{20}$ cm$^{-3}$ concentration of acceptor impurities. Further, along with the increase of S to 1,800 m$^2$/g, the specific capacitance of the carbon materials grows monotonously. It is clear that such porous carbon materials may provide for quite high specific capacitance as compared with conventional porous carbon materials.

The decrease of the screening length of the porous carbon materials may be achieved by different methods. Such methods may include: (a) increasing the concentration of free charge carriers by forming intrinsic point defects and their complexes in the crystal lattice of the carbon particle crystallites; (b) increasing the concentration of the surface states; and (c) increasing the concentration of impurity atoms forming the donor and acceptor levels of the band gap. Since the porous carbon materials have a high surface area, this results in a great number of dangling bonds of the carbon's surface atoms, and, consequently, high surface state density. The small crystals of, in fact, all the carbon materials, have intrinsic defects and different complexes with high concentrations. Further, the bulk of intrinsic defects, including the surface ones, are acceptors that impart p-type conductivity with low hole concentration to the majority of the carbon materials. Therefore, in order to provide for a more effective decrease of the screening length by increasing the concentration of acceptors, it is more appropriate to use carbon materials with initial p-type conductivity.

The screening length may also be reduced by introducing additional acceptors or donors in the carbon materials. The introduction of acceptors is preferable since, firstly, the increase in concentrations of acceptors will result in an increase in concentration of free holes and conductivity of the walls, and a decrease of the screening length. If, to increase the concentration of donors in the carbon materials, it is necessary to perform their doping, the concentration of acceptors may be increased both by doping and forming different intrinsic defects of the crystal lattice. Secondly, in order to provide for similar concentrations of free charge carriers during the doping by donors, a much higher concentration of donor impurities is required (due to mutual compensation of donors and intrinsic acceptors) than of acceptor impurities during doping by acceptors. The increase in the concentration of impurity (mostly donor) atoms in the carbon materials reduces the overpotential of hydrogen and oxygen evolution. This is accompanied by a reduction of capacitor voltage and, accordingly, of capacitor specific energy parameters. Therefore, increasing the concentrations of holes by intrinsic defects and acceptor impurities is a more practically feasible method and it brings about a reduction of the overpotential of hydrogen and oxygen evolution.

However, if the use of porous carbon materials with electronic conductivity for the manufacture of positive and negative electrodes of capacitors does not make it possible to manufacture capacitors with high specific energy and capacity parameters, in some cases carbon materials with electronic conductivity may be limited only to the manufacture of DEL capacitor negative electrodes. Applicability of n-type carbon materials for the manufacture of negative electrodes depends on the properties of the electrolyte used and the range of the electrode's operating potentials. Such an electrode may operate most effectively only when its potential does not exceed PZC in the operating electrolyte. Therefore, in order to manufacture electrodes with DEL based on non-metal conducting materials (including the ones based on porous carbon materials) and with high specific energy and capacity parameters of electrode materials, it is necessary to dope electrode materials by acceptors and/or increase concentration of intrinsic defects of acceptor type.

The type of conductivity and concentration of holes in the carbon material has considerable effect, apart from capacitance and specific energy parameters, on the power parameters of electrochemical capacitors (as clarified below). During DEL formation with positive ions from the side of the electrolyte and electrons from the side of the carbon material of p-type conductivity (as it is shown in FIG. 1a), the surface potential $\phi_s$ on the wall's surface has a positive value. When the electrode's potential $\psi$ shifts to the area of negative values, the concentration of non-equilibrium electrons grows in SCR of the pores' walls. Since the pores' walls have p-type conductivity, as non-equilibrium electrons their compensation with holes occurs at the same time. Further, the energy band in SCR becomes bent downwards, and Fermi level gets closer to the conductivity band (i.e., the value $\xi_F$ decreases across the wall's thickness). This brings about ionization of acceptor centers and a change in concentration of free charge-carriers in SCR. In this case, the electric charge of DEL ions from the side of the electrolyte is compensated by the electric charge of ionized acceptors of SCR. The above formulas (1) and (2) show that as $\xi_F$ decreases, the concentration of holes decreases and the concentration of electrons increases. Since the intrinsic concentration of holes of the bulk of carbon materials with p-type conductivity is about $n_i = 8 \cdot 10^{18}$ cm$^{-3}$ (at room temperature), as $\psi$ decreases, the concentration of holes in SCR decreases to the value of $n_i$. As $\psi$ decreases further, the concentrations of electrons in SCR grow.

FIG. 1a shows that the value of $\xi_F$ depends on the depth of the pore's wall, (i.e., $\xi_F = \xi_F(X)$). In case of a significant change of electrode potential, the conductivity of the wall changes on the depth of SCR from degenerate p-type to degenerate n-type (i.e., there occurs conductivity inversion). The thickness ($\delta$) of the inversion layer depends on the value of the electrode's potential and the wall's hole concentration. At a low value of hole concentration and $\psi$ potential, the thickness ($\delta$) may reach the thickness $d_{wall}$. In this case, a strong change in the conductivity of the wall will take place.

It is clear that as potential ψ decreases, a physical p-n junction appears in SCR, which disappears as ψ increases. This process takes place in electrodes with DEL of electrochemical capacitors during their charge and discharge.

When the electrode's potential ψ shifts to the area of positive values, DEL consists of negative ions from the side of the electrolyte and of holes from the side of the wall of the carbon material (FIG. 1b). The energy bands become bent upwards, and, as the potential increases, the value $\xi_F$ grows. Consequently, there is growth in the hole concentration in SCR. That is, when DEL of the said type is formed in the near-surface layers of the wall, a strongly degenerate area is formed, thereby resulting in the growth of the walls' conductivity.

The above arguments show that as the electrode's potential shifts to the positive or negative areas (in relation to PZC), there occurs a significant change of free charge carrier concentration and, as it follows from the formula (3), there is a change of SCR conductivity of the wall. It is clear that if the initial concentration (the concentration at PZC) of holes in the wall is low, with great polarization of the surface potential, the value of W in the area of the spatial charge of the wall may spread along its entire thickness. This will result in a strong change in the walls' conductivity and, consequently, a change of conductivity of the porous carbon materials. In practice, this change of conductivity is observed in porous carbon materials with low conductivity and with excessively thin pore walls. This results in low values of specific energy and power parameters of electrochemical capacitors based on porous carbon materials with low free charge carrier concentration.

Therefore, the capacitance and conductivity of porous nonmetal conducting materials, including porous carbon materials, depend considerably on conductivity type, the concentration of majority charge carriers, and the surface state density. According to the present invention, high specific energy and power parameters of electrochemical capacitors with DEL based on porous carbon materials are provided by p-type conductivity and high hole concentration in the pore walls. P-type conductivity and high hole concentration in carbon materials may be produced by, for example: thermal, ionic or electrochemical doping by acceptor impurities; irradiation by fast particles or high energy quantums; chemical, and electrochemical and/or thermal treatment. Further, doping acceptor impurities may be added in the initial substance to synthesize carbon materials to their carbonization and activation. In the latter case, doping takes place during carbonization and is one of the most practically feasible methods of carbon material doping.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Doping of Carbon Materials

Figure 1:
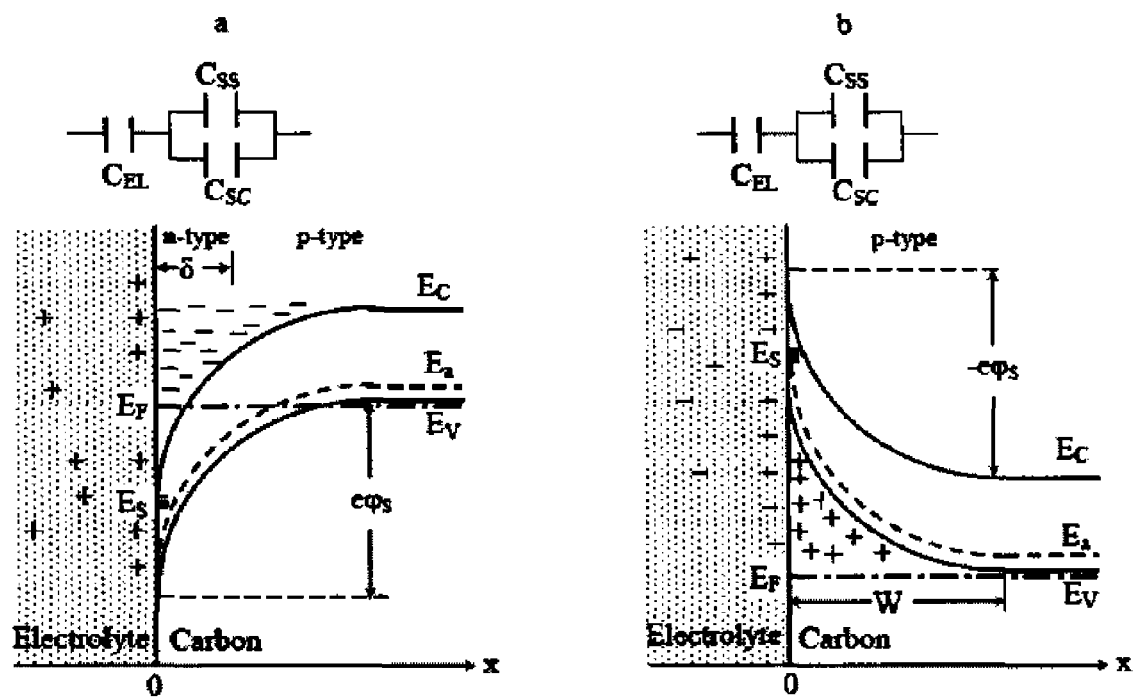
FIG. 1 is an energy diagram representing an "electrolyte-carbon" interface.

There are different technological means of deliberate introduction of impurity atoms in the lattice of carbon, which is the essence of doping. Doping of carbon materials is most widely used in practice to adjust and change their conductivity and free charge carriers concentration. In order to manufacture electrochemical capacitors, use is mostly made of carbon materials synthesized from organic substances containing great quantity of carbon in the molecule. Therefore, doping of carbon materials is often effected by adding in the initial substance a compound containing doping atoms. During high-temperature carbonization there occur decomposition of the substance containing doping atoms, and introduction of doping atoms in the crystal lattice of carbon. The other well-known method of doping is introducing doping impurities in the lattice of carbon materials by mixing the doping substance with fine-dispersed carbon powders and their subsequent high-temperature treatment.

In order to demonstrate feasibility of the present invention, an activated carbon powder with a small thicknesses of the pore walls was doped. Therefore, to provide for more effective doping of this powder, the technology of thermal doping was used. For the purposes of doping, activated carbon powder was used, whose specific developed surface was S=1,310 $m^2/g$. Further, the initial powder had p-type conductivity, and the hole concentration was $2 \cdot 10^{19}$ cm. The measurements of the surface area and size distribution of the pore volume of the source carbon powder was performed by BECKMAN COULTER™ SA 3100™ analyzer. The results of the measurements showed that the average dimensions of the diameter of the main pores did not exceed 32.8 Å. Since the walls of the pores of this carbon powder are thin (about 8 Å), the doping atoms penetrate deep into the walls in a quite fast manner, and in order to perform thermal doping of the powder, a long time period and high temperatures are not required.

When parameters of carbon materials are controlled by their doping, one of the major problems is introduction of doping atoms in the crystal lattice sites. Apart from the lattice sites, impurity atoms may be located in interstitial sites or, which is more often observed in practice, strong chemical bond is formed with the participation of carbon atoms of the regular carbon lattice, such as, for example, silicon atoms. In the latter case, the doping atoms have insignificant effect on electric the parameters of carbon materials, however, cause a significant change of their physical and chemical parameters.

The most suitable impurity atoms whose doping makes it possible to exercise considerable control of the properties of carbon materials for different electrochemical capacitors are Boron (B), Nitrogen (N), Phosphorus (P) and Silicon (Si). Boron and nitrogen are among a few elements which may penetrate the crystal lattice of the carbon matrix as a substitute element. Besides, boron in carbon materials is an acceptor, and nitrogen is a donor. Since the covalent radius of boron is 0.83 Å, and carbon is 0.77 Å, the substitute atoms of boron do not cause great deformation of crystal lattices of the bulk of carbon matrixes, including the graphite lattice. In the conditions of thermodynamic equilibrium, solubility of boron in the graphite lattice is more than 2%, which makes it possible to change electrical and physical parameters of carbon materials in a wide range.

Nitrogen, which has a covalent radius of 0.70 Å, penetrates, in sufficient quantity into the lattice of the carbon matrixes as a substitute element. Silicon and phosphorus have great covalent radiuses (Si being about 1.17 Å and P about 1.10 Å), and in a substitute position they bring about great deformation of the crystal lattices of carbon materials. However, during joint doping of B and N, B and Si, B and P, with low content of Si and P, it is also possible to control parameters of carbon materials. Joint doping of carbon materials by donors and acceptors is particularly important for the manufacture of electrodes of the capacitors with organic electrolyte.

Figure 2:
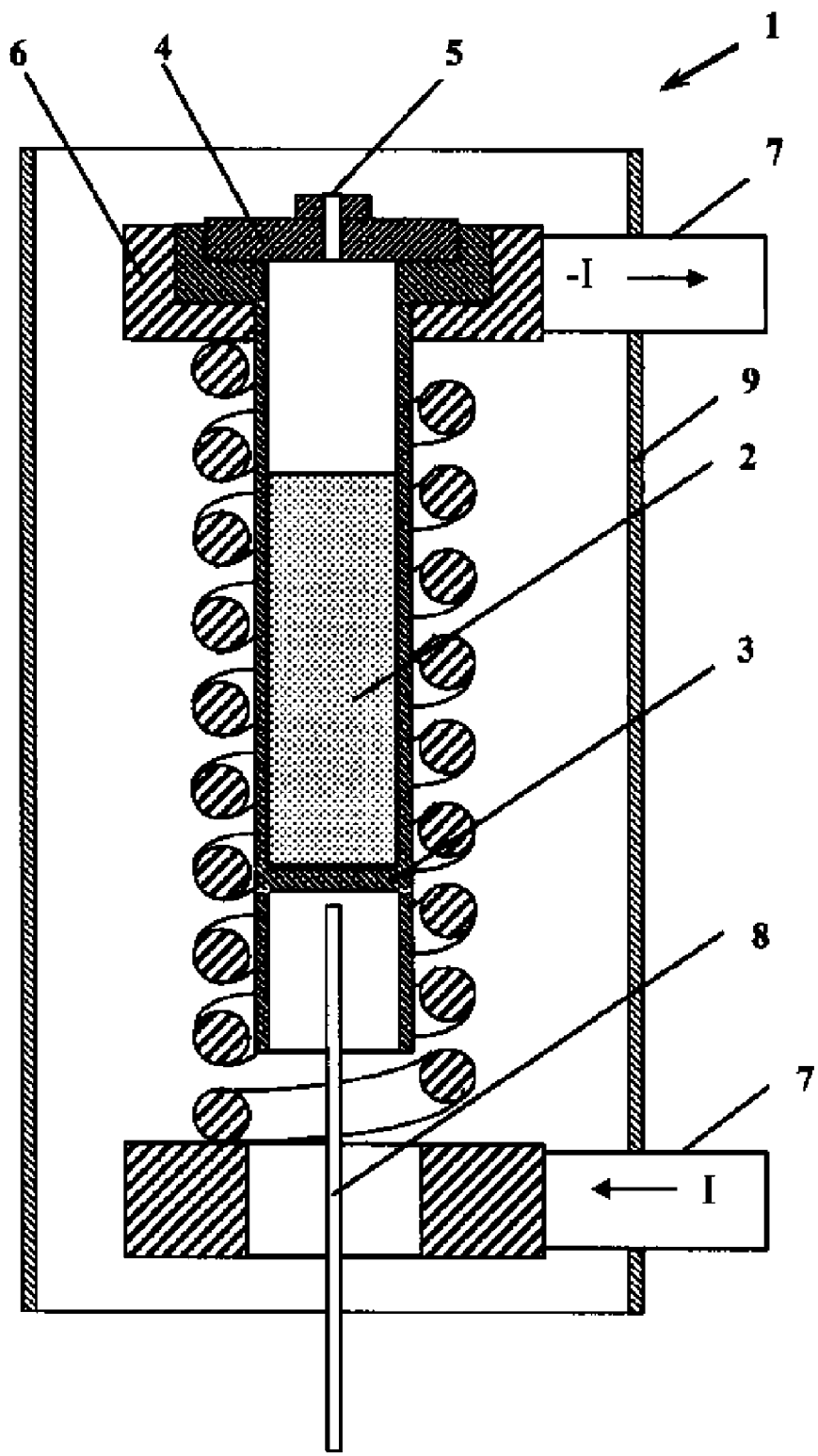
FIG. 2 depicts a special chamber for the thermal doping of carbon powders.

In order to dope carbon powders at increased temperatures, and with a view of minimizing introduction therein of uncontrolled impurities, doping of the powders was performed in a special chamber 1 with the design set forth in FIG. 2. High temperature components of the chamber were made of MPG-6-type graphite. During doping or high-temperature treatment, the carbon powder 2 was placed in the bunker 3 made of graphite, which was closed by the graphite cover 4. There is a special opening 5 in the cover to exhaust gases and moisture, which are evolved from the powder during its heating. The bunker is placed inside the spiral 6 made of graphite. The heating of the graphite spiral was effected by electric current by means of the current leads 7 made of tantalum. In order to fix and control the powder's temperature, a platinum and platinum-rhodium thermocouple 8 is used, which is placed near the bunker's bottom, as it is shown in FIG. 2. In order to reduce the gradient of the powder's temperature by the bunker's height, the chamber has an external screen 9 made of niobium.

When the carbon powders are doped, the chamber 1 is placed under the cap of the vacuum installation, which makes it possible to reduce the pressure inside the chamber to about $5 \cdot 10^{-5}$ mm Hg at a temperature of up to 1,400° C. Prior to thermal treatment, evacuation of the chamber was performed over 30 minutes at room temperature to remove gasses and moisture from the volume of the pores of the carbon powders. Thereafter, the chamber's temperature was gradually increased to the specified value. Further, the chamber's exhaust was continued with a view of protecting the carbon powder and parts of the chamber against oxidation processes. When the thermal treatment process was completed and the chamber was cooled to room temperature, the carbon powder was taken out of the bunker to perform research of the powder's electrical and electrochemical parameters.

Example 1

In order to dope a carbon powder by boron, the initial powder was wetted with aqueous solution of boric acid ($H_3BO_3$). The calculated value of boron content in the powder was about 1%. Following the wetting, the carbon powder was subjected to vacuum drying at the temperature of 110° C. during 5 hours. Thereafter, the power's thermal doping was performed in the chamber 1 according to the afore-mentioned technology. During doping, the chamber's temperature increased from room temperature to 1,100° C., the heating rate was about 10° C./min. Thereafter, the powder was held at this temperature during 30 minutes, and further the chamber's temperature slowly decreased to the room temperature value.

Following doping of the carbon powder, measurements were taken to identify specific area of the developed surface, conductivity type, holes concentration and dependence of the specific electric resistance ($\rho$) of the powder doped by boron, on the external pressure (P). The results of the measurements showed that after the doping, p-type of the powder's conductivity was retained, the concentration of holes increased to $1.2 \cdot 10^{20}$ cm$^{-3}$, and the value of its S parameter did not, in fact, change (S=1,315 m$^2$/g). The Increase in the hole concentration results in a considerable reduction of $\rho$ of the powder after its doping by boron. As it follows from FIG. 3, in a wide range of pressure (5-475 kg/cm$^2$) the specific resistance of the initial powder has a higher value (curve 1) than $\rho$ of the powder doped by boron (curve 2). At high (>100 kg/cm$^2$) values of P, the value $\rho$ of the powder doped by boron has weaker dependence on the pressure as compared with the similar dependence of the initial powder.

The obtained results are evidence of the fact that, following the carbon powder's doping by boron, firstly, the concentration of holes grows, the contact resistance between the powder's particles decrease. Inasmuch as at low values of P (<75 kg/cm$^2$), the powder's specific resistance is determined mostly by the contact resistance between its particles, it becomes evident from the obtained results that doping by boron results in the growth of the surface conductivity of the powder's carbon particles. Secondly, bearing in mind that, at high values of P, the value $\rho$ depends mostly on the resistance of the pores' walls, it is not difficult to suppose that doping by boron also results in the growth of conductivity of the walls of the carbon powders' pores.

It follows from the obtained results of the measurements of electric parameters of the initial powder and the powder doped by boron that, when carbon plates are manufactured on the basis of the carbon powders doped by boron, the carbon plates will have higher conductivity, as compared with the conductivity of the carbon plates based on conventional carbon powders. The use of the carbon plates based of carbon powders doped by boron for the manufacture of electrodes of electrochemical capacitors with DEL will make it possible to decrease the losses of energy and increase power parameters of the capacitors during their charge and discharge. According to the present invention, doping of carbon powders by boron atoms will result, apart from improvement of the powders' conductivity, in an increase of their specific capacity and energy parameters, which will be shown when the powders are tested as components of electrochemical capacitors.

In most cases, the electrodes with DEL based on activated carbon materials for electrochemical capacitors are usually manufactured by rolling or punching of mixture of carbon powders and polymer binding materials resistant to electrolytes. Carbon fiber cloths are also used in electrochemical capacitors. However, fiber materials have high cost and lower manufacturability, which brings about an increase of the cost of the capacitors and decrease of their competitive strength. Often, binding and technologically auxiliary materials (used for the manufacture of carbon plates), partially block access of the electrolyte to the plates; pores, which results in reduction of their energy and capacity parameters. To rule out any negative effect of the binding material on the parameters of the carbon powders and to increase accuracy of measurements, the electrodes with DEL, shown in this example, were made only of carbon powders and current collectors.

The electrodes with DEL were manufactured as follows: four (4) grams of the carbon powder under study were mixed with the electrolyte of sulfuric acid aqueous solution of 1.26 g/cm$^3$ density. The obtained paste based on the carbon powder 11 was put in a bag made of FPP-type separator 12 having 100 µm thickness and REXAM 13 conducting polymer of 50 µm thickness. Thereafter, the separator was welded with REXAM polymer in the upper part of the bag and, by subsequent rolling and pressing of the powder in the bag, the electrode's active material, with overall dimensions of 50×70×1.7 mm, was manufactured.

Figure 4:
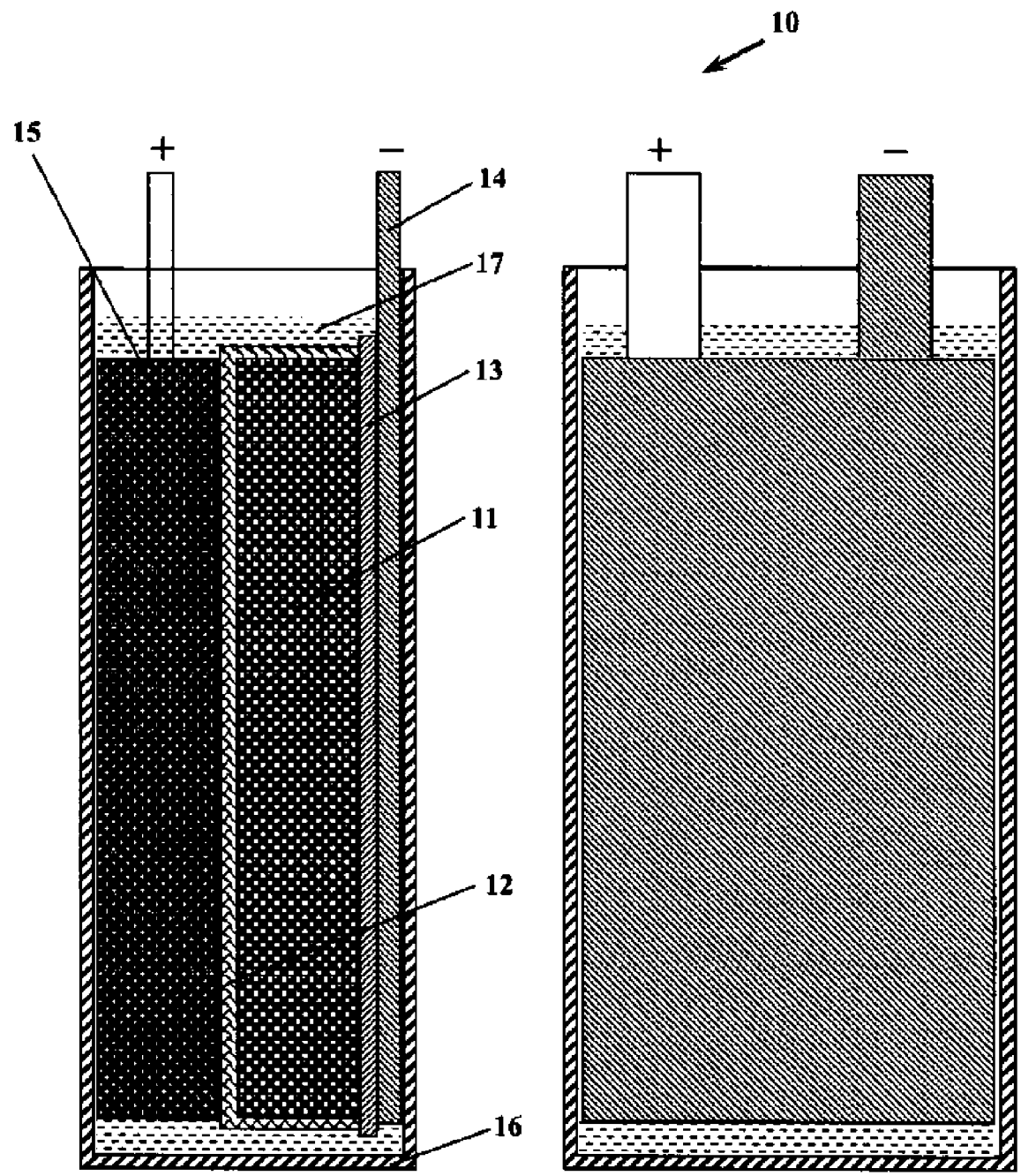
FIG. 4 illustrates one exemplary embodiment of a DEL electrochemical capacitor of a $PbO_2|H_2SO_4|C$ system.

In order to test parameters of the carbon powder, a heterogeneous electrochemical capacitor (HES) of a PbO$_2$|H$_2$SO$_4$|C system with the design shown in FIG. 4 was manufactured. In this HES capacitor 10 a positive electrode 15 having a PbO$_2$ active mass and overall dimensions of 50×70×1.4 mm was used. The current collector 14 of the negative electrode had overall dimensions of 50×70×0.26 mm and was made of lead alloy and had a protective conducting coating. The electrode pack (11, 12, 13, 14, 15) of the capacitor was put in the case 16 and the capacitor was filled with an electrolyte 17 of sulfuric acid aqueous solution of 1.26 g/cm$^3$ density.

With a view of comparing energy, capacity and power parameters of the initial carbon powder and the carbon powder doped by boron, two capacitors with the afore-mentioned similar design were manufactured. The initial carbon powder was used in one capacitor (HES #1), and in the other one (HES #2)—the same carbon powder but doped by boron.

After the capacitors were manufactured, they were placed in a special device which provides for even pressure (about 5 kg/cm$^2$) on the electrodes of the capacitors. Further, balancing was performed of the Coulomb capacities of the positive and negative electrodes of HES #1 and HES #2 capacitors. During the balancing of the Coulomb capacities of the electrodes, the capacitors were charged and discharged by constant current with their considerable overcharge. The discharge of the capacitors during their balancing was performed to the voltage of 0.8 V.

With a view of measuring the maximum capacity and energy parameters of the capacitors, their testing was performed with the following algorithm of charge-discharge cycles: charge by constant 150 mA current during 7.5 hours; a 5-minute pause after the charge; discharge by constant 150 mA current to the voltage of 0.8 V; and a 5-minute pause after the discharge. Five charge-discharge cycles of the capacitors were performed to get stable energy and capacity parameters. Besides, during the charge and discharge of the capacitors, their |Z| impedance was measured at 337 s$^{-1}$ cyclic frequency.

The testing of energy and capacity parameters of HES-capacitor #1 show that the value of the average capacitance (C) is about 3,150 F and the average capacitance of the initial powder ($C_m$) was about 787.5 F/g. Besides, the charge and discharge energy of the capacitor have the values of 8,584.5 J and 4,478.6 J, respectively. The Coulomb capacity during the capacitor's discharge to 0.8V is 0.905 Ah. It follows from the said results that the energy efficiency ($\eta_E$) and Coulomb efficiency ($\eta_Q$) of HES-capacitor #1 in the above-mentioned mode of charge-discharge cycle have the values of $\eta_E$=52.2% and $\eta_Q$=80.4%. We should note that the low values of $\eta_E$ and $\eta_Q$ are determined by the high level of the capacitor's state of charge, and, along with the decrease of the state of charge and values of the charge and discharge currents, the values of $\eta_Q$ and $\eta_E$ will grow.

Figure 5:
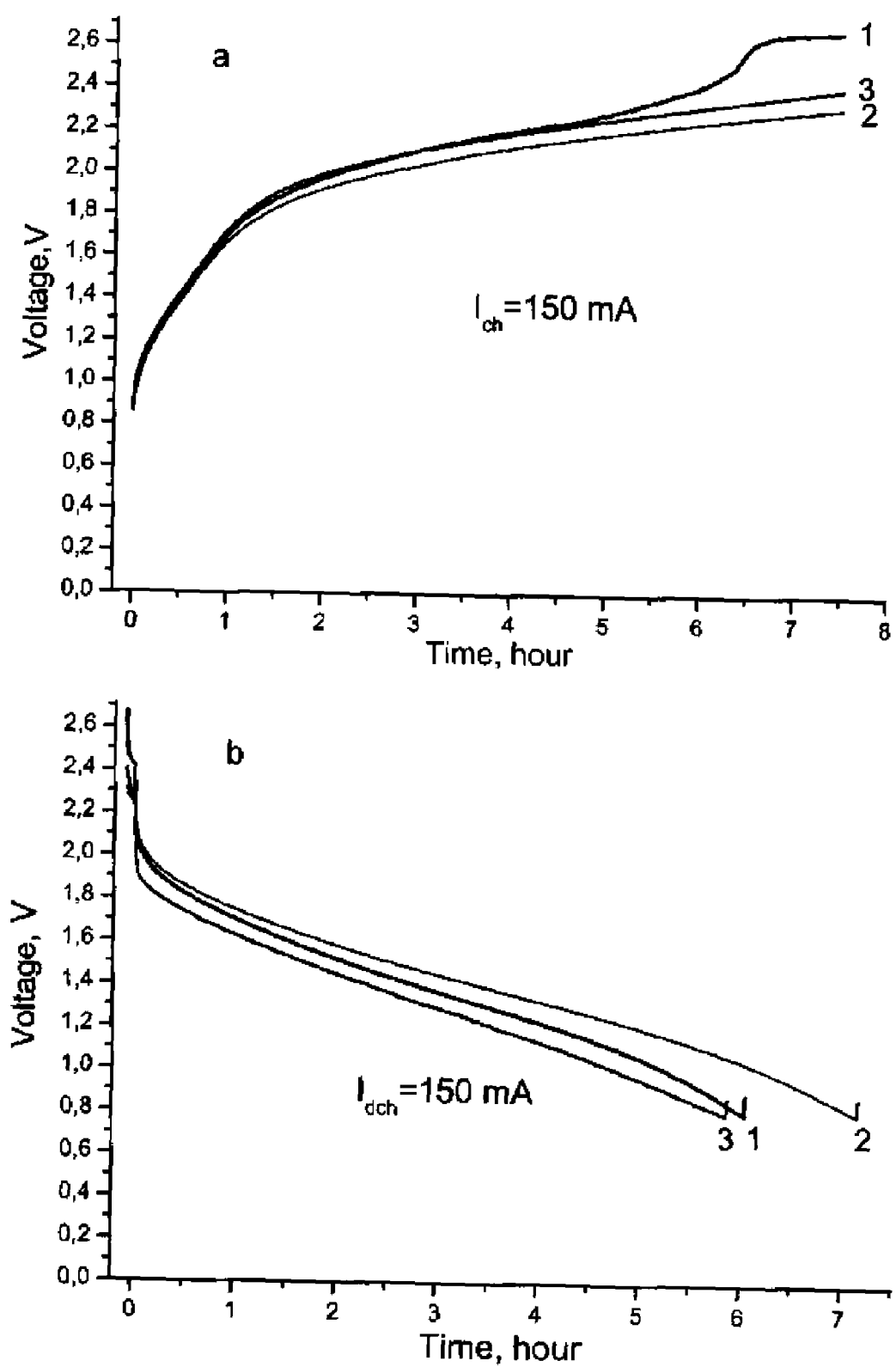
FIG. 5 is a graph showing the time dependence of the voltage of the capacitors HES-#1 (1), HES-#2 (2) and HES-#3 (3) during their charge and discharge by constant current.

It follows from FIG. 5, which shows the time dependence of the voltage of HES-capacitor #1 during its charge and discharge (dependence 1), that the capacitor's voltage during the charge grows in a quite linear manner to the voltage of about 1.8 V (FIG. 5a), i.e., in the voltage range of 0.8-1.8 V the capacitance of the capacitor does not, in fact, depend on its voltage. Taking into account the fact that the potential of this capacitor's positive electrode is about 1.7 V (in relation to SHE) and is not, in fact, polarized during its charge and discharge, it is obvious that in the potential range of +0.9 V to −0.1 V the capacitance of the initial carbon powder depends very little on its potential. A slight nonlinearity of the voltage in the range of 0.8-1.8 V is mostly determined by the change of the polarization resistance of the capacitor's negative electrode.

When the voltage of HES-capacitor #1 is more than 1.8V, the rate of its voltage growth decreases monotonously along with the increase of the state of the capacitor's charge, i.e. the capacitance grows. This process continues to the voltage of about 2.2.V and is determined by the strong change of ψ potential of the negative electrode in relation to the potential of the zero charge. Thereafter, along with the increase of the state of the capacitor's charge, the rate of the voltage's growth increases up to the end of the charge process (FIG. 5a, dependence 1). Besides, a particularly strong growth of the voltage takes place at the final stage of the charge process. It is obvious that at high absolute values of ψ there occurs a significant growth of the resistance of the walls of the carbon powder's pores and contact resistance between carbon particles.

The discharge of HES-capacitor #1 shows that its discharge voltage in a quite wide range has a linear pattern (FIG. 5b, dependence 1). Besides, it is obvious from FIG. 5b that in the voltage range of about 1.2-0.8 V, along with the capacitor's discharge, the nonlinearity of its voltage grows too. The growth of nonlinearity in this voltage range is mostly determined by the change of the concentration of the majority carriers in the walls of the carbon powder's pores and, consequently, by the change of conductivity of the negative electrode when it's potential has a significant shift to the area of the positive potentials.

The above-mentioned behavior of the capacitor's voltage during its charge and discharge brings about extra losses of energy and, consequently, a decrease of the capacitor's energy efficiency. It follows from FIG. 6 (curve 1) that the values of |Z| impedance of HES-capacitor #1 at the beginning ($|Z|_{BDCH}$) and at the end ($|Z|_{EDCH}$) of the discharge process are as follows: $|Z|_{BDCH}$=470.3 mOhm and $|Z|_{EDCH}$=124.0 mOhm, i.e., during the charge and discharge of HES-capacitor #1 its |Z| impedance changes 3.78 times and the growth of impedance is 346.6 mOhm.

The time dependence of the voltage (U(t)) of HES-capacitor #2 shows that the value of (U(t)) during its charge in the range of 0.8-1.8 V also grows linearly (FIG. 5a, dependence 2) like the voltage of HES-capacitor #1 in the same range. Besides, the value −dU(t)/dt in this area of voltages has a higher value in HES-capacitor #2 than in HES-capacitor #1. Consequently, in the range of the charge voltages of 0.8-1.8 V, the capacitance of HES-capacitor #2 is higher than the capacitance of HES-capacitor #1, i.e., the doping of the carbon powder by boron brings about a slight growth of the capacitance at low values of the capacitor's voltage. As it follows from FIG. 5a, over the voltage of 1.8V, the rate of the growth of the voltage of HES-capacitor #2 decreases monotonously along with the increase of the state of its charge, and, unlike HES-capacitor #1, this process continues up to the end of the capacitor's charge. Besides, unlike the voltage of HES-capacitor #1, the voltage of HES-capacitor #2 at the final stage of the charge does not have uneven growth. This is evidence of the fact that the doping by boron brings about an increase of the conductivity of the carbon powder and a decrease of the contact resistance between its particles.

Figure 6:
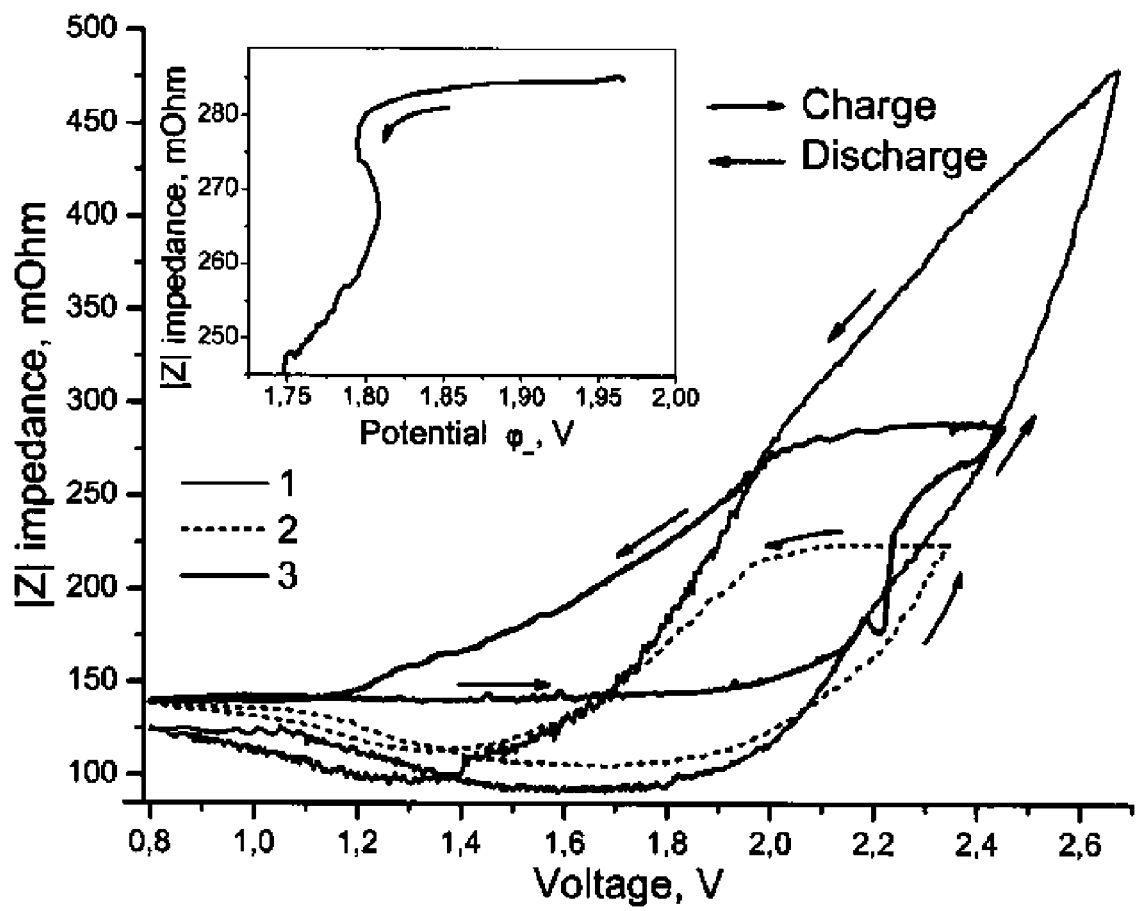
FIG. 6 is a graph showing the dependences of |Z| impedance on the voltage of the capacitors HES-#1 (1), HES-#2 (2) and HES-#3 (3) during their charge and discharge by constant current; the inset showing the dependence of |Z| impedances on the potential (in relation to the potential of $PbO_2/PbSO_4$ reference electrode) of the negative electrode of HES-capacitor #3.

A significant decrease of the contact resistance between the carbon powder's particles and the growth of capacitance of the walls of its pores are also confirmed by the low value of |Z| impedance of HES-capacitor #2 (FIG. 6, curve 2). FIG. 6 shows that the values $|Z|_{BDCH}$ and $|Z|_{EDCH}$ of this capacitor are as follows: $|Z|_{BDCH}$=224.7 mOhm and $|Z|_{EDCH}$=138.9 mOhm. During the charge and discharge, |Z| impedance of HES-capacitor #2 changes 1.62 times and the increment of impedance is 85.8 mOhm. The obtained results show that the doping of the carbon powder by boron results in a decease of the impedance of HES-capacitor and, consequently, a growth of its power parameters. Since, after the doping of the carbon powder by boron, a significant decrease of |Z| impedance of HES-capacitor #2 takes place during its charge and discharge, it is not difficult to suppose that by increasing the concentration of holes in the walls of the powder's pores, as it was shown above, it is possible to quite effectively control the power parameters of the capacitors with DEL.

Apart from the increase of the power parameters of HES-capacitor, the doping of the carbon powder by boron brings about growth of the energy and capacity parameters of the capacitor. FIG. 5b shows that the duration of the discharge of HES-capacitor #2 increases 1.19 times as compared with the duration of the discharge of HES-capacitor #1 and the linearity of the discharge voltage increases. The average value of the capacitance of HES-capacitor #2 grows and is C=3,670 F and the specific capacitance of the carbon powder doped by boron amounts to $C_m$=917.5 F/g, i.e., the doping by boron brings about growth of the specific capacitance of the carbon powder as compared with the specific capacitance $C_m$=787.5 F/g) of the initial powder. The growth of electrical and Coulomb capacity and conductivity of the carbon powder after the doping by boron brings about an increase of the discharge energy and energy and Coulomb efficiencies of the capacitor. The discharge energy of HES-capacitor #2 is 5,343.8 J and the energy and Coulomb efficiencies are 65.8% and 95.4% respectively.

Therefore, the testing of energy, capacity and power parameters of HES-capacitors #1 and #2 shows that the doping of the carbon powder by boron makes it possible to increase the energy and power parameters of HES-capacitors. It is obvious that the change of the concentration of boron in the walls of the pores of the porous carbon materials may reach maximum values of the specific capacitance and power parameters of the capacitors with DEL. It is also obvious that the optimal concentration of the impurity of boron atoms depends on the thickness of the pores' walls, electrophysical parameters and content of other impurity atoms in carbon powders, and, for some particular carbon powder, it may be determined experimentally.

Example 2

For the doping of the carbon powder by nitrogen, the powder was wetted by nitric acid ($HNO_3$) with the calculated value of the nitrogen content in the powder, which evolves during decomposition of the nitric acid, of 0.5%. After the wetting, the powder was thermally doped in the chamber 1 as per the afore-mentioned technology. During the powder's doping, the temperature in the chamber increased to 900° C. and the powder was held at this temperature during 30 minutes.

Figure 3:
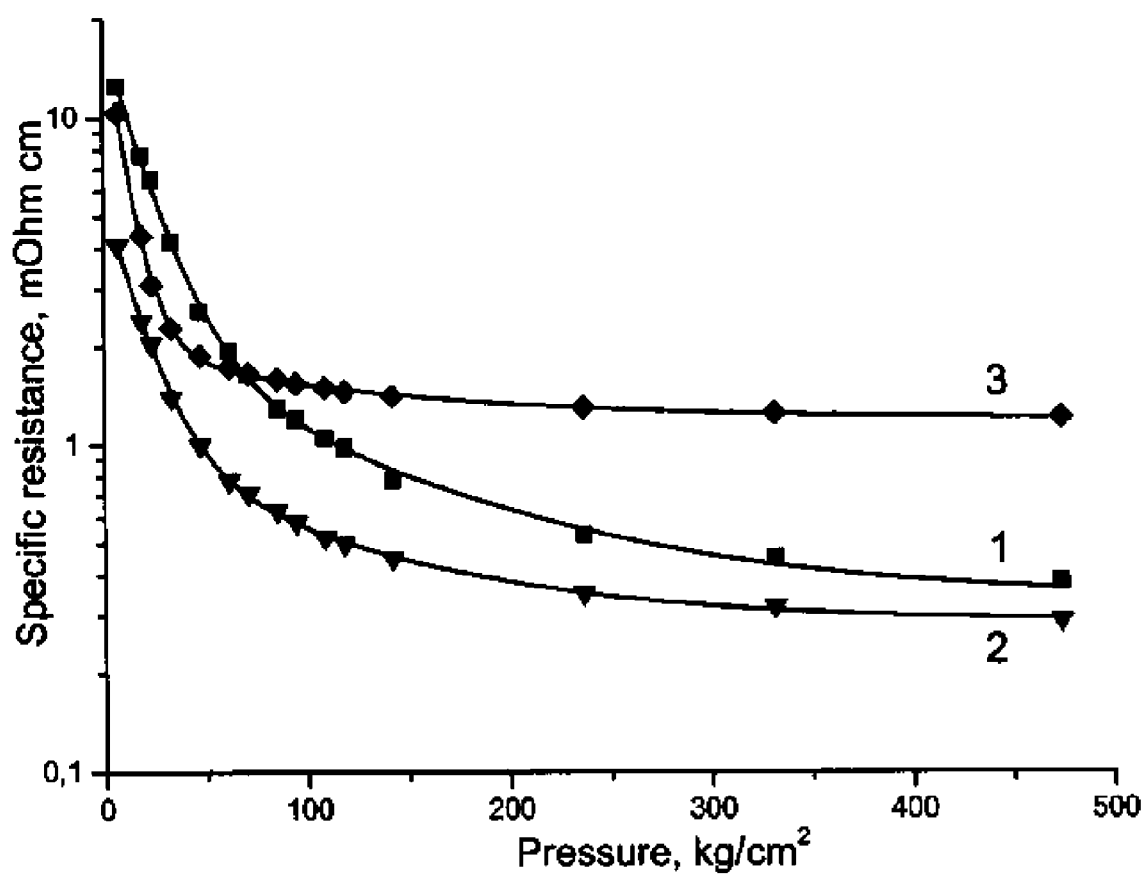
FIG. 3 is a graph showing the dependence of specific electric resistance on the pressure of the initial carbon powder (1), carbon powder doped by boron (2) and nitrogen (3)

After the doping of the carbon powder by nitrogen, measurements were taken to identify the specific area of the developed surface, type of conductivity, concentration of holes and dependence of ρ on P of the powder. The results of the measurements show that the doping by nitrogen with low concentration does not bring about any change of the type of the powder's conductivity, however, it reduces the concentration of holes from about $2·10^{19}$ $cm^{-3}$ to about $9.5·10^{18}$ $cm^{-3}$. Besides, S value of the powder grows insignificantly (S=1, 327 m²/g). FIG. 3 shows that at low values of pressure, ρ value of the powder doped by nitrogen (curve 3) is lower than ρ value of the initial powder (curve 1) and higher than ρ value of the powder doped by boron (curve 2). At high (>100 kg/cm²) values of pressure, ρ value of the powder doped by nitrogen depends very little on the pressure, but has much higher value than ρ of the initial powder and the powder doped by boron.

A more detailed analysis of the results of the research of electrophysical parameters of the powder doped by nitrogen makes it possible to establish that the doping of powder by nitrogen results in a shift of Fermi level to the conductivity band. The value of $\xi_F$ decreases and there occur mutual compensation of the donor centers and acceptor centers, which are determined by intrinsic defects of crystallites of carbon particles. This brings about growth of the specific resistance of the walls of the pores, carbon powder and, consequently, ρ dependence of the powder on the pressure at P>100 kg/cm² weakens. Since, along with the decrease of $\xi_F$, the surface donor centers are partially filled with electrons, and the conductivity of the surfaces of the walls of the pores and carbon particles grows, the contact resistance between the particles of the powders decreases. According to the present invention, the change of the conductivity of the carbon powder shall bring about a change of its specific capacity.

To test parameters of the carbon powder doped by nitrogen, HES-capacitor (HES #3) with the design and dimensions of the capacitors shown in Example 1 was manufactured. To manufacture a negative electrode HES-capacitor #3, a carbon powder of 4 g mass doped by nitrogen was used. The energy and capacity parameters of the capacitor were tested in the modes similar to the testing of parameters of HES-capacitors #1 and #2.

The testing of energy and capacity parameters of HES-capacitor #3 showed that the voltage of the capacitor in the range of 0.8-1.8 V (along with the growth of the capacitor's state of charge) grows relatively faster than the growth of the voltages of HES-capacitors #1 and #2 in the said range (FIG. 5a). This is evidence of little reduction of the capacitance of the carbon powder doped by nitrogen. Thereafter, the rate of the growth of the voltage of HES-capacitor #3, along with the increase of the state of its charge, decreases monotonously up to the end of the charge process (FIG. 5a, dependence 3). U(t) dependences of HES-capacitors #1, #2 and #3 show that the voltage of HES-capacitor #3, after the doping of the carbon powder by nitrogen, increases monotonously up to the end of the charge process. Besides, the value of the voltage of HES-capacitor #3 has intermediate position between the voltages of HES-capacitors #1 and #2. As a result of it, the charge energy of HES-capacitor #3 (8,387.4 J) has the value which is lower than the value of the charge energy of HES-capacitor #1 (8,584.5 J) and higher than the charge energy of HES-capacitor #2 (8,116.5 J), i.e., the energy losses during the charge of the capacitor decrease after the doping of the carbon powder by nitrogen.

It follows from FIG. 5b (dependence 3) that the voltage of the fully charged HES-capacitor #3 in the entire range of discharge has, in fact, a linear pattern. If, at the final stages of the discharge process, of HES-capacitors #1 and #2, there is a slight distortion of the linearity of their discharge voltages, the linearity changes of the voltage of HES-capacitor #3 is not observed in this range. It is obvious that the doping of the carbon powder by nitrogen brings about increase of the linearity of the discharge voltages of the capacitors, with a significant shift of the potential of its negative electrode to the positive area. According to the afore-mentioned theoretical calculations, the growth of the linearity of the discharge voltage of the capacitor in the range of 1.2-0.8 V is determined (after the doping of the carbon powder by nitrogen) by a shift of Fermi level to the conductivity band. It is also obvious that the carbon powders doped by nitrogen may be used for the manufacture of positive electrodes with DEL for different electrochemical capacitors. The obtained experimental results confirm that by changing the concentration of nitrogen in the carbon materials, it is possible to control their properties and, consequently, this will make it possible to manufacture positive electrodes with DEL for electrochemical capacitors of different systems with high specific energy, power and operation parameters.

Along with increase of the linearity of the discharge voltage of the capacitor, after the doping of the carbon powder by nitrogen, there is a slight decrease of its capacitance. The values of the capacitance and discharge energy of HES-capacitor #3 are 3,130 F and 4,143.2 J, respectively, while the energy and Coulomb efficiency of the charge-discharge process are $\eta_E$=49.4% and $\eta_Q$=78.2%. It is obvious from the obtained results that, after the nitrogen doping of the carbon powder with the specific capacitance of 787.5 F/g, the specific capacitance of the powder decreases insignificantly and is 782.6 F/g. Immediately after the charge process, the voltage of the fully charged HES-capacitor #1 has a higher value than the voltage of HES-capacitor #3 (FIG. 5a, dependences 1 and 3), however, despite a slight (0.6%) decrease of the specific capacitance of the carbon powder doped by nitrogen, the Coulomb capacity (0.879 Ah) of HES-capacitor #3 is only 3% lower than the Coulomb capacity (0.905 Ah) of HES-capacitor #1 during the discharge of these capacitors to the voltage of 0.8 V. The decreased value of the voltage of the fully charged capacitor with a negative electrode made of the powder doped by nitrogen shows that the penetration of nitrogen atoms in the crystallite lattice of the carbon powder's particles brings about a slight decrease of its overpotential of hydrogen evolution. This effect also results in deceased values of the Coulomb and energy efficiencies of HES-capacitor #3 during its full charge and discharge.

The research of the dependence of |Z| impedance on the charge and discharge voltage of HES-capacitor #3 shows that the doping of the carbon powder by nitrogen brings about decrease and change of the pattern of the capacitor's impedance dependence (FIG. 6, curve 3). Firstly, the values $|Z|_{BDCH}$ and $|Z|_{EDCH}$ of HES-capacitor #3 has lower values ($|Z|_{BDCH}$=286.8 mOhm and $|Z|_{EDCH}$=140.1 mOhm) than the corresponding values of impedance of the capacitor with a negative electrode made of the initial carbon powder. During the charge and discharge, |Z| impedance of HES-capacitor #3 changes 2.05 times, and the impedance increment is 146.6 mOhm. Firstly, during the charge of HES-capacitor #3 in the voltage range of 2.15-2.25 V, there is a change of the monotonous increase of impedance. In the said voltage range, the value of |Z| impedance first decreases, passes through its minimum and further grows in a fast manner.

The detailed research of the dependence of |Z| impedance on the potential of the negative electrode of HES-capacitor #3 shows that the similar change of the impedance also takes place during the discharge of this capacitor. The inset of FIG. 6 shows that, at the potential of the negative electrode ($\phi$) of 1.8 V (in relation to the potential of $PbO_2/PbSO_4$ reference electrode), uneven decrease of |Z| impedance takes place. Besides, in a very narrow range of the potential during the capacitor's discharge, the impedance decreases and $\phi$ grows. The detailed research showed that uneven change of |Z| impedance during the charge and discharge of HES-capacitor #3 is related to nitrogen atoms. The value and position of the uneven change of |Z| impedance depends on the concentration of nitrogen, majority free charge carriers and values of charge and discharge currents. According to the description of the present invention, the uneven change of |Z| impedance is related to the formation of the physical p-n junction in the near-surface layers of the walls of the carbon powder's pores at a significant shift of its potential in relation to the potential of the zero charge.

Therefore, the testing of the energy, capacity and power parameters of HES-capacitor #3 shows that the doping of the carbon powder by nitrogen makes it possible to increase the specific power parameters of HES-capacitors. It is obvious that by changing the concentration of nitrogen in the pores' walls of the porous carbon materials' it is possible to increase considerably the specific power parameters of various capacitors with DEL.

Example 3

In this example the carbon plate was irradiated by fast electrons to increase the concentration of holes and conductivity of the electrode with DEL. The carbon plate, based on activated carbon powders and polymer binding material had a shape of the disk having 2 mm thickness and 33 mm diameter. The specific electric resistance of the initial plate had the value of 3.4 Ohm·cm. The mass and volume density of the disk made of the carbon plate were 1.0 g and 0.59 g/cm$^3$, respectively. The plate was subjected to irradiation by fast electrons with the average energy of 5.6 MeV. The total dose of electrons was $5.2 \cdot 10^{19}$ electrons/cm$^2$. During the irradiation, the average temperature of the plate did not rise over 60° C.

The measurement of the specific resistance of the carbon plate after the irradiation showed that the specific resistance of the plate decreased to the value of 2.1 Ohm·cm. Before the irradiation, the carbon plate had feebly expressed p-type conductivity and after the irradiation, along with the growth of conductivity (1.62 times), p-type conductivity acquired a strongly expressed pattern.

Figure 7:
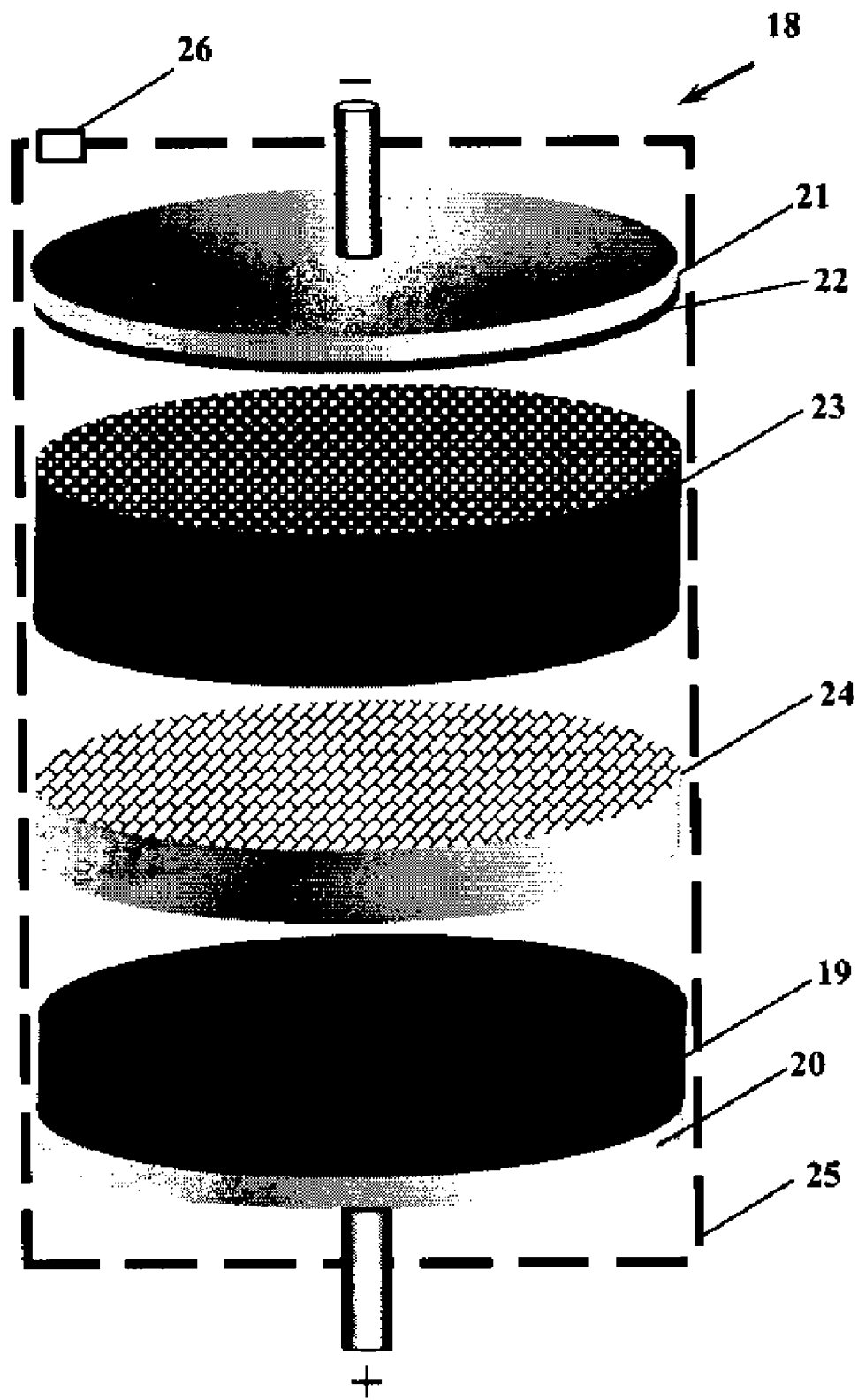
FIG. 7 depicts an alternate embodiment of an electrochemical capacitor with a DEL of $PbO_2|H_2SO_4|C$ system, the capacitor being cylindrical in shape.

To test the capacity and energy parameters of the carbon plate irradiated by fast electrons and to determine the efficiency of the effect of fast electrons on the parameters of the carbon plate, two sealed HES-capacitors were manufactured (HES-#4 and HES-#5). These $PbO_2|H_2SO_4|C$ system capacitors had a cylindrical form with the design 18 shown in FIG. 7, and with similar overall dimensions of the components. The initial carbon plate was used in HES-capacitor #4, and the carbon plate irradiated by fast electrons was used in HES-capacitor #5. The positive electrode of the capacitors 18 consisted of the active mass 19 based on $PbO_2$ and the current collector 20 made of the lead alloy containing 5% Sb. The diameter and thickness of the positive electrode were 33 mm and 1.4 mm, respectively. The negative electrode of the capacitor 18 consisted of the current collector 21 with the conducting protective coating 22 and the carbon plate 23. The current collector 21 of the negative electrode was made of tin-lead alloy and had its diameter of 33 mm. AGM-separator 24 of 0.6 mm thickness was used the capacitor 18. After the wetting of the positive electrode, carbon plate and separator by the electrolyte (not shown in FIG. 7) of aqueous sulfuric acid solution with 1.26 g/cm$^3$ density, the capacitor 18 was assembled. The electrode pack of the capacitor 18 was put in a sealed polymer case 25. The capacitor 18 was equipped with a low pressure emergency valve 26.

The measurements of the maximum capacity and energy parameters of HES-capacitors #4 and #5 were taken with the use of the following algorithm of charge-discharge cycles: charge by 60 mA constant current during 5 hours; a 5-minute pause after the charge; discharge by 60 mA constant current to the voltage of 0.8 V; a 5-minute pause after the discharge. In order to obtain stable energy and capacity parameters, 20 charge-discharge cycles of each capacitor with the above cycle algorithm were performed. The measurements of the dependence of |Z| impedance on the capacitors' voltage were taken at the 337 s$^{-1}$ cyclic frequency.

Figure 8:
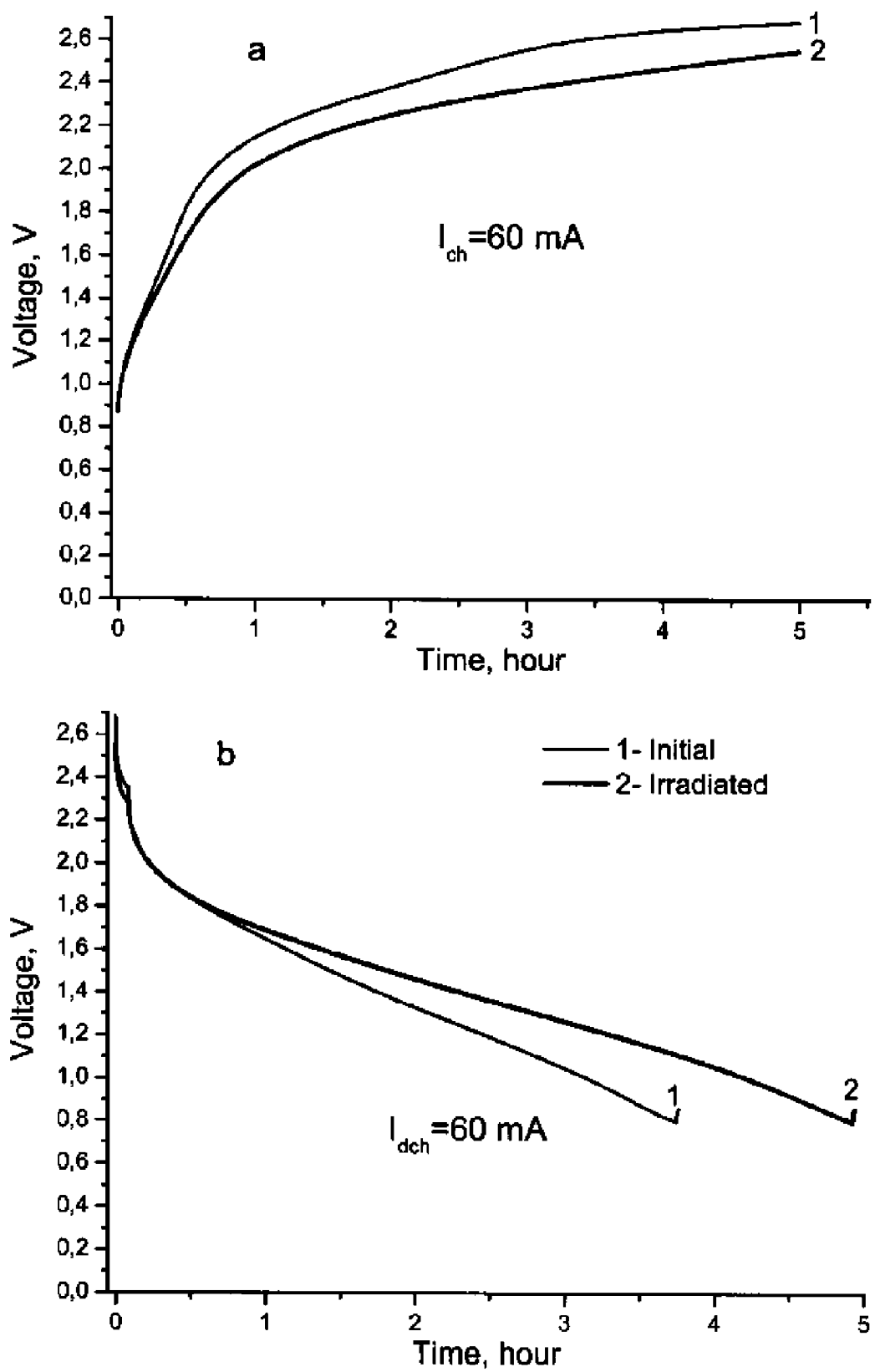
FIG. 8 is a graph representing the time dependence of voltage of the capacitors HES-#4 (1) and HES-#5 (2) during their charge and discharge by constant current.

The time dependence of the voltage of HES-capacitors #4 and #5 (FIG. 8) shows that, during the charge by 60 mA current, in the entire voltage range, the voltage of HES-capacitor #4 grows faster than the voltage of HES-capacitor #5 (FIG. 8a). In the voltage range of about 0.8-2 V, the voltage of HES-capacitor #4 grows approximately 1.4 times faster than the voltage of HES-capacitor #5. Since HES-capacitors #4 and #5 have identical design, it is obvious that influence of fast electrons on the carbon plate, apart from the growth of the conductivity, brings about the growth of its capacitance. A more detailed research of the parameters of HES-capacitors #4 and #5 showed that the growth of the capacitance of HES-capacitor #5 in the voltage range of 0.8-2V is mostly determined by the increase of the surface state's density of the carbon plate pores' walls after its irradiation by fast electrons. Besides, we should note that after the irradiation of the carbon plate, the wettability of the polymer binding material increases. This increases the efficiency of the electrolyte's passage in the pores of the carbon material, which, in its turn, also brings about a partial growth of the capacitor's capacitance.

It is obvious from the time dependence of the discharge voltage of HES-capacitors #4 and #5 that high linearity of the capacitors' voltages is retained, in fact, in the entire range of the discharge. We should note that a slight deviation from the linearity of the capacitors' voltage at the initial stage of the discharge is related to the polarization resistances of the carbon plate and high level of the capacitors' state of charge. The average value of capacitance calculated on the basis of the discharge voltages of HES-capacitors #4 and #5 is 663.2 F and 937.5 F respectively. Since the mass of the carbon plates of the capacitors is 1.0 g, $C_m$ of the initial carbon plate has the value of 663.2 F/g, and $C_m$ of the carbon plates irradiated by fast electrons has the value 937.0 F/g. Therefore, the irradiation by electrons with the energy of 5.6 MeV and the dose of 5.2·10$^{19}$ electrons/cm$^2$ brought about 1.41-fold growth of the capacitance $C_m$ of the carbon plate.

The discharge energy and discharge Coulomb capacity of HES-capacitor #4 have the values of 1,092.3 J and 219.9 mA·h, respectively, and of HES-capacitor #5, 1,437.7 J and 290.2 mA·h, respectively—i.e., after the irradiation of the carbon plate by fast electrons the discharge energy and discharge Coulomb capacity of the capacitor increased 1.32 times. Apart from the increase of the energy and capacity parameters, there is considerable growth of the energy and Coulomb efficiencies of HES-capacitor #5. At full charge and discharge to 0.8 V, $\eta_E$ and $\eta_Q$ parameters of HES-capacitor #4 were $\eta_E$=43.1% and $\eta_Q$=73.3%, and of HES-capacitor #5 – $\eta_E$=60.4% and $\eta_Q$=96.7%.

Figure 9:
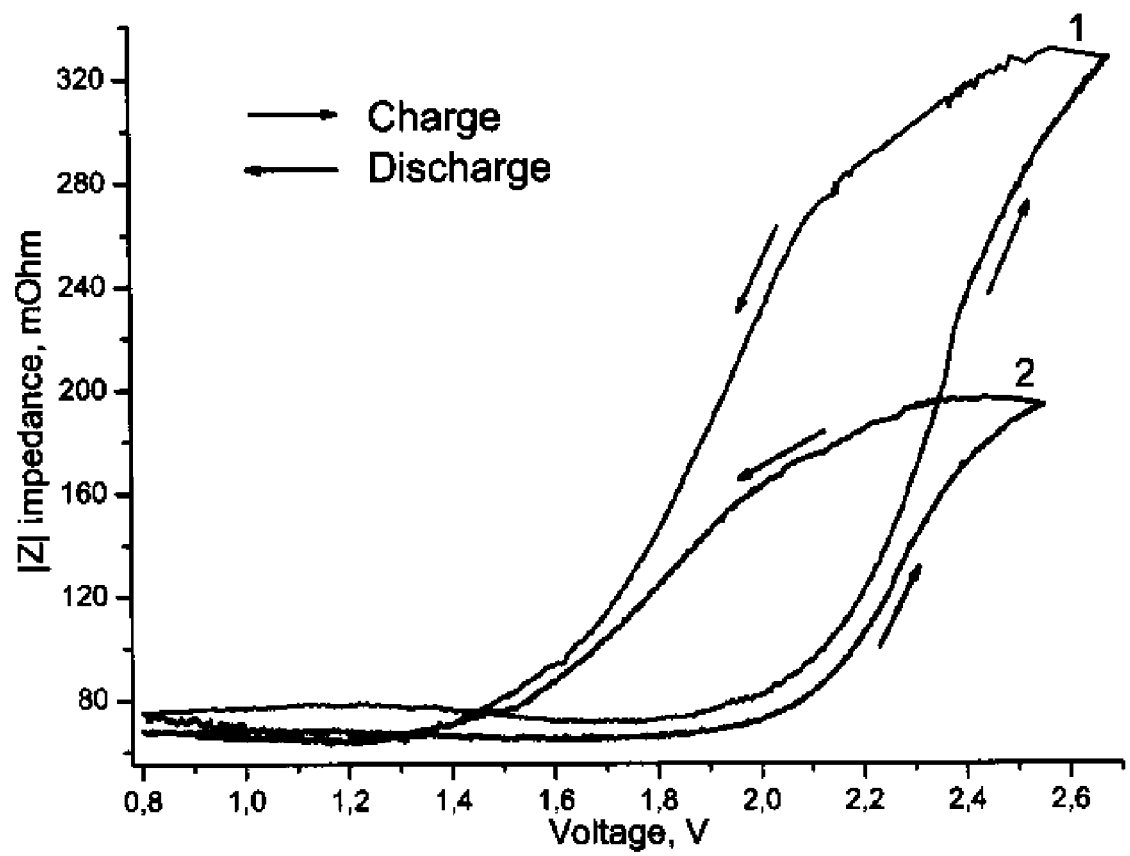
FIG. 9 is a graph showing the dependence of |Z| impedances on the voltage of the capacitors HES-#4 (1) and HES-#5 (2) during their charge and discharge by constant current.

The research of the dependences of |Z| impedance of HES-capacitors #4 and #5 on their voltages (FIG. 9), during the charge and discharge of the capacitors, makes it possible to establish that, in parallel with the growth of the conductivity and capacitance of the carbon plate irradiated by fast electrons, decrease of |Z| impedance of HES-capacitor #5 takes place. FIG. 9 shows that irradiation of the carbon plate by fast electrons does not bring about any change of the pattern of the dependence of the capacitor's impedance, but the value of |Z| impedance in a wide range of voltages decreases significantly. The values of $|Z|_{BDCH}$ and $|Z|_{EDCH}$ of HES-capacitors #4 and #5 have the value of 327.4 mOhm, 75.0 mOhm, 194.0 mOhm, 68.1 mOhm, respectively. It follows from the obtained results that, after the irradiation of the carbon plate, $|Z|_{BDCH}$ of the capacitor decreases 1.69 times. Since the increment of the impedance of HES-capacitors #4 and #5 is 252.4 mOhm and 125.9 mOhm respectively, it is obvious that HES-capacitor #5 has a higher specific power than HES-capacitor #4.

It is also obvious that the decrease of the capacitor's impedance results in the reduction of the energy losses during its charge and discharge and, accordingly, in the growth of the energy and Coulomb efficiencies which is shown experimentally above.

Therefore, it clearly follows from this example that the influence of fast electrons on the carbon plate brings about a significant growth of its conductivity and capacitance. During irradiation of the carbon materials by high-energy electrons, a lot of lattice defects are formed, which increase the concentration of equilibrium holes and the surface states density. It is obvious that a similar influence on the parameters of the carbon materials will also affect other particles and quantums with energies which are higher than the threshold energy of the formation of the carbon materials' lattice defects. The values of the growth of the capacitance and conductivity of the carbon materials depend on the energy, mass and dose of irradiating particles. By changing the energy and dose of different irradiating particles it is possible to effectively control the energy and capacity parameters of both the carbon materials and other conducting non-metal materials designed for the manufacture of electrodes with DEL of electrochemical capacitors.

While the specific examples set forth in the present invention demonstrate only high efficiency of the improvement of specific energy, capacity and powder parameters of HES-capacitor of PbO2|H2SO4|C system with different variants of implementation of the proposed electrode with DEL based on activated carbon materials, it should be obvious to experts skilled in the art of electrochemical capacitors that the given examples do not limit the possibility of: a) manufacturing the proposed electrodes with DEL based on other active materials set forth in the invention and by other methods set forth in the invention; and b) using the proposed electrodes with DEL in electrochemical capacitors of other systems.

Therefore, while certain embodiments of the present invention are described in detail above, the scope of the invention is not to be considered limited by such disclosure, and modifications are possible without departing from the spirit of the invention as evidenced by the following claims:

What is claimed is:

1. An electrode for use in a double electric layer electrochemical capacitor, the electrode based on porous non-metal conducting materials with p-type conductivity, comprising:
    an electrode material having a concentration of holes in its pore walls of not less than 1·10$^{19}$ per cm$^{-3}$;
    an active electrode material containing impurity atoms that are acceptors and impurity atoms that are donors; and a polymer binding material;

wherein the active material also includes intrinsic lattice defects that are acceptors.

2. The electrode of claim 1, wherein the concentration of holes in the pore walls of the electrode material is in the range of about $5 \cdot 10^{19}$ to about $2 \cdot 10^{20}$ per $cm^{-3}$.

3. The electrode of claim 1, wherein the electrode material surface has a specific area in the range of about 600 to about 2,500 $m^2/g$.

4. The electrode of claim 1, wherein the electrode material contains boron in an amount of about 0.08 to about 2.5%.

5. The electrode of claim 1, wherein the electrode material contains nitrogen in an amount of about 0.1 to about 5.0%.

6. The electrode of claim 1, wherein the electrode material contains silicon in an amount of about 0.001 to about 0.2%.

7. The electrode of claim 1, wherein the electrode material is doped using a thermal, ionic, or electrochemical method.

8. The electrode of claim 1, wherein the electrode material is subjected to chemical, electrochemical and/or thermal treatment.

9. The electrode of claim 1, wherein doping of the electrode material is performed by adding doping impurities to an initial electrode substance to synthesize active material until its carbonization and activation processes take place.

10. The electrode of claim 1, wherein the electrode material is subjected to irradiation by high-energy particles or quantums.

11. The electrode of claim 1, wherein the active material is fabricated of porous non-metal conducting materials selected from the group consisting of SiC, Si, titanium oxides, TiC, TiCN, TiN, MoN, $RuO_2$, $SnO_2$, carbin, fullerenes, carbon nanoparticles, carbon nanotubes, and diamond, in various mixtures or combinations and in various proportions.

12. The electrode of claim 11, further comprising a polymer binding material.

13. The electrode of claim 11, wherein the concentration of holes in the pore walls of the electrode material is in the range of about $1 \cdot 10^{19}$ to about $5 \cdot 10^{19}$ per $cm^{-3}$.

14. An electrode for use in a double electric layer electrochemical capacitor, the electrode based on porous non-metal conducting materials with p-type conductivity, comprising:

an electrode material having a concentration of holes in its pore walls of not less than $1 \cdot 10^{19}$ per $cm^{-3}$ and a specific area of between about 600 to about 2,500 $m^2/g$;

a polymer binder; and an active electrode material doped at least with Boron;

wherein the active material also includes intrinsic lattice defects that are acceptors.

15. The electrode of claim 14, wherein the concentration of holes in the pore walls of the electrode material is in the range of about $5 \cdot 10^{19}$ to about $2 \cdot 10$ per $cm^{-3}$.

16. The electrode of claim 14, wherein the electrode material contains boron in an amount of about 0.08 to about 2.5%.

17. The electrode of claim 14, wherein the electrode material further comprises nitrogen in an amount of about 0.1 to about 5.0%.

18. The electrode of claim 14, wherein the electrode material further comprises silicon in an amount of about 0.001 to about 0.2%.

19. The electrode of claim 14, wherein the electrode material is doped using a thermal, ionic, or electrochemical method.

20. An electrode for use in a double electric layer electrochemical capacitor, the electrode based on porous non-metal conducting materials with p-type conductivity, comprising:

an electrode material having a concentration of holes in its pore walls of not less than $1 \cdot 10^{19}$ per $cm^{-3}$ and a specific area of between about 600 to about 2,500 $m^2/g$;

a polymer binder; and an active electrode material doped with a dopant selected from the group consisting of Boron, Nitrogen, Phosphorus, Silicon, and various combinations thereof;

wherein the active material also includes intrinsic lattice defects that are acceptors.

21. The electrode of claim 20, wherein the electrode material is doped using a thermal, ionic, or electrochemical method.

22. An electrode for use in a double electric layer electrochemical capacitor, the electrode based on porous non-metal conducting materials with p-type conductivity, comprising:

an electrode material having a concentration of holes in its pore walls of not less than $1 \cdot 10^{19}$ per $cm^{-3}$ and a specific surface area in the range of about 600 to about 2,500 $m^2/g$; and an active electrode material containing impurity atoms that are acceptors and impurity atoms that are donors;

wherein the active material also includes intrinsic lattice defects that are acceptors.

23. An electrode for use in a double electric layer electrochemical capacitor, the electrode based on porous non-metal conducting materials with p-type conductivity, comprising:

an electrode material having a concentration of holes in its pore walls of not less than $1 \cdot 10^{19}$ per $cm^{-3}$, said electrode material containing a dopant selected from the group consisting of boron in an amount of about 0.08 to about 2.5%, nitrogen in an amount of about 0.1 to about 5.0%, and silicon in an amount of about 0.001 to about 0.2%; and an active electrode material containing impurity atoms that are acceptors and impurity atoms that are donors;

wherein the active material also includes intrinsic lattice defects that are acceptors.

\* \* \* \* \*

UNITED STATES PATENT AND TRADEMARK OFFICE
CERTIFICATE OF CORRECTION

PATENT NO.       : 7,919,014 B2
APPLICATION NO.  : 11/946035
DATED            : April 5, 2011
INVENTOR(S)      : Kazaryan et al.

Page 1 of 1

It is certified that error appears in the above-identified patent and that said Letters Patent is hereby corrected as shown below:

Title page 1, line 2, Other Publications, please delete "Prodceedings" and insert -- Proceedings --

In Column 3, line 56, please delete "$0 \leqq x \leqq d$" and insert -- $0 \leq x \leq d$ --

In Column 5, line 13, please delete "$\psi \geqq \psi_{PZC}$" and insert -- $\psi \geq \psi_{PZC}$ --

In Column 5, line 16, please delete ""$\psi \geqq \psi_{PZC}$" and insert -- $\psi \geq \psi_{PZC}$ --

In Column 6, line 5, please delete "$d_{wall} \leqq L_D$" and insert -- $d_{wall} \leq L_D$ --

In Column 6, line 21, please delete "$d_{wall} \leqq 16.64$" and insert -- $d_{wall} \leq 16.64$ --

In Column 6, line 29, please delete "$d_{wall} \leqq 5.26$" and insert -- $d_{wall} \leq 5.26$ --

In Column 6, line 46, please delete "$d_{wall} \leqq 2L_D$" and insert -- $d_{wall} \leq 2L_D$ --

In Column 11, line 2, please delete "electric the" and insert -- the electric --

In Column 12, line 4, please delete "power's" and insert -- powder's --

In Column 12, line 19, please delete "Increase" and insert -- increase --

In Column 15, line 42, please delete "and energy and" and insert -- and --

In Column 18, line 26, please delete "materials'" and insert -- materials --

In Column 19, line 3, please delete "used" and insert -- used in --

In Column 20, line 45, please delete "powder" and insert -- power --

In Column 21, line 52, please delete "$2 \cdot 10$" and insert -- $2 \cdot 10^{20}$ --

Signed and Sealed this
Sixteenth Day of August, 2011

David J. Kappos
*Director of the United States Patent and Trademark Office*